United States Patent
Hiraiwa et al.

(10) Patent No.: US 11,939,549 B2
(45) Date of Patent: Mar. 26, 2024

(54) BIOMASS SOLID FUEL

(71) Applicant: Mitsubishi UBE Cement Corporation, Tokyo (JP)

(72) Inventors: Yuusuke Hiraiwa, Ube (JP); Shigeya Hayashi, Ube (JP); Nobuyuki Ooi, Ube (JP)

(73) Assignee: Mitsubishi UBE Cement Corporation, Tokyo (JP)

(*) Notice: Subject to any disclaimer, the term of this patent is extended or adjusted under 35 U.S.C. 154(b) by 0 days.

(21) Appl. No.: 16/652,623

(22) PCT Filed: Oct. 1, 2018

(86) PCT No.: PCT/JP2018/036673
§ 371 (c)(1),
(2) Date: Mar. 31, 2020

(87) PCT Pub. No.: WO2019/069849
PCT Pub. Date: Apr. 11, 2019

(65) Prior Publication Data
US 2020/0239799 A1 Jul. 30, 2020

(30) Foreign Application Priority Data
Oct. 4, 2017 (JP) .................................. 2017-194513

(51) Int. Cl.
*C10L 5/44* (2006.01)
(52) U.S. Cl.
CPC ........................ *C10L 5/44* (2013.01)

(58) Field of Classification Search
CPC .... C10L 5/08; C10L 5/28; C10L 5/363; C10L 5/44; C10L 5/442; C10L 2290/28;
(Continued)

(56) References Cited

U.S. PATENT DOCUMENTS

| 4,627,575 A | 12/1986 | Johns et al. |
| 9,523,056 B2 | 12/2016 | Hayashi et al. |

(Continued)

FOREIGN PATENT DOCUMENTS

| JP | 2016-079374 A | 5/2016 |
| RU | 2518068 C2 | 6/2014 |

(Continued)

OTHER PUBLICATIONS

Ragland et al. "Preperties of Wood for Combustion Analysis". Bioresource Technology.37.1991.pp. 161-168 (Year: 1991).*
(Continued)

*Primary Examiner* — Latosha Hines
(74) *Attorney, Agent, or Firm* — KNOBBE, MARTENS, OLSON & BEAR LLP

(57) ABSTRACT

A biomass solid fuel having low self-heating. In the biomass solid fuel, mutual bonding or adhesion between pulverized biomass particles is maintained and the biomass solid fuel has a maximum reaching temperature of less than 200° C. in a self-heating property test based on the "UNITED NATIONS Recommendations on the TRANSPORT OF DANGEROUS GOODS: Manual of Test and Criteria: 5th revised Edition: Test method for Self-heating substances".

6 Claims, 7 Drawing Sheets

(58) Field of Classification Search
CPC .. C10L 2290/30; C10L 2290/32; Y02E 50/10; Y02E 50/30
See application file for complete search history.

(56) References Cited

U.S. PATENT DOCUMENTS

| | | | |
|---|---|---|---|
| 10,570,349 B2 | 2/2020 | Grønn | |
| 2015/0315505 A1* | 11/2015 | Hayashi | C10L 5/361 44/532 |
| 2017/0218290 A1* | 8/2017 | Hayashi | C10L 5/442 |
| 2019/0119593 A1* | 4/2019 | Hayashi | C10L 5/442 |

FOREIGN PATENT DOCUMENTS

| | | | |
|---|---|---|---|
| WO | WO 2014/087949 A1 | 6/2014 | |
| WO | WO 2016/056608 A1 | 4/2016 | |
| WO | WO-2016056608 A1 * | 4/2016 | ............... C10L 5/08 |
| WO | WO2017/175733 A1 | 10/2017 | |
| WO | WO-2017175733 A1 * | 10/2017 | ............... C10L 5/08 |
| WO | WO-2018052359 A1 * | 3/2018 | ............. C12P 13/14 |

OTHER PUBLICATIONS

International Preliminary Report on Patentability issued in International Application No. PCT/JP2018/036673 dated Apr. 8, 2020.
Examination Report in counterpart Australian Patent Application No. 2018346029 dated Feb. 26, 2021.
Notification of Substantive Examination Result in Indonesian Patent Application No. P00202003199 dated Sep. 16, 2021.
Office Action in Russian Patent Application No. 2020115186, dated Mar. 16, 2022.

* cited by examiner

BIOMASS SOLID FUEL

This application is the U.S. National Phase under 35 U.S.C. § 371 of International Application PCT/JP2018/036673, filed Oct. 1, 2018, designating the U.S., and published in Japanese as WO 2019/069849 on Apr. 11, 2019 which claims priority to Japanese Patent Application No. 2017-194513, filed Oct. 4, 2017, the entire content of which is incorporated herein by reference.

TECHNICAL FIELD

The present invention relates to a biomass solid fuel.

BACKGROUND ART

In the past, solid fuels obtained by molding wood-based biomasses are known. However, they have problems that handling thereof is difficult because they disintegrate when exposed to rain water and the like during outdoor storage, and also COD (chemical oxygen demand) of discharged water increases due to the elution of organic substances such as tar and the like. Patent Document 1 discloses a method for obtaining a solid fuel comprising performing molding and heating after steam exploding a plant-based starting material, in which the obtained solid fuel does not disintegrate when exposed to rain water and the like during outdoor storage although a binder and the like is not used, and in addition, the elution of tar component is prevented and COD in a discharged water is reduced. Patent Document 2 describes a biomass solid fuel which achieves a reduced COD in discharged water and has low disintegration property. The biomass solid fuel described in Patent Document 2 is obtained by molding biomass into unheated biomass blocks and heating them. Since this method does not include the steam explosion step, cost increase can be suppressed as compared with the method for manufacturing a biomass solid fuel described in Patent Document 1.

CITATION LIST

Patent Document

Patent Document 1: WO2014/087949
Patent Document 2: WO2016/056608

SUMMARY OF INVENTION

Technical Problem

However, in Patent Document 1 and Patent Document 2, investigations on the self-heating property of solid fuels were insufficient. An object of the present invention is to provide a biomass solid fuel which has low self-heating and is easy to transport and store.

Solution to Problem

One embodiment of the present invention relates to the following matters.

1. A biomass solid fuel, wherein mutual bonding or adhesion between pulverized biomass particles is maintained, and which has a maximum reaching temperature of less than 200° C. in a self-heating property test based on the "UNITED NATIONS Recommendations on the TRANSPORT OF DANGEROUS GOODS: Manual of Test and Criteria: $5^{th}$ revised Edition: Test method for Self-heating substances".

2. The biomass solid fuel according to the above item 1, having a volatile matter (dry ash free basis) of 65.0 to 95.0 wt % and a fuel ratio of 0.10 to 0.45.

3. The biomass solid fuel according to the above item 1 or 2, wherein mutual bonding or adhesion between pulverized biomass particles is maintained after immersion in water.

4. The biomass solid fuel according to any one of the above items 1 to 3, wherein
   a raw material of the pulverized biomass comprises rubber tree, and the biomass solid fuel has a volatile matter (dry ash free basis) of 74.0 wt % or more and a fuel ratio of 0.37 or less;
   a raw material of the pulverized biomass comprises acacia, and the biomass solid fuel has a volatile matter (dry ash free basis) of 77.5 wt % or more and a fuel ratio of 0.285 or less;
   a raw material of the pulverized biomass comprises tree species of Dipterocarpaceae, and the biomass solid fuel has a volatile matter (dry ash free basis) of 77.2 wt % or more and a fuel ratio of 0.295 or less;
   a raw material of the pulverized biomass comprises *Pinus radiata*, and the biomass solid fuel has a volatile matter (dry ash free basis) of 77.5 wt % or more and a fuel ratio of 0.295 or less;
   a raw material of the pulverized biomass comprises a mixture of larch, spruce and birch, and the biomass solid fuel has a volatile matter (dry ash free basis) of 71.0 wt % or more and a fuel ratio of 0.405 or less; or
   a raw material of the pulverized biomass comprises a mixture of spruce, pine and fir, and the biomass solid fuel has a volatile matter (dry ash free basis) of 74.3 wt % or more and a fuel ratio of 0.34 or less.

5. The biomass solid fuel according to any one of the above items 1 to 4, which is obtained by molding pulverized biomass into unheated biomass blocks, and heating the unheated biomass blocks.

Advantageous Effect of Invention

According to the present invention, there can be provided a biomass solid fuel which has low self-heating and is easy to transport and store, and a method of manufacturing the same.

DESCRIPTION OF EMBODIMENT

Figure 1:
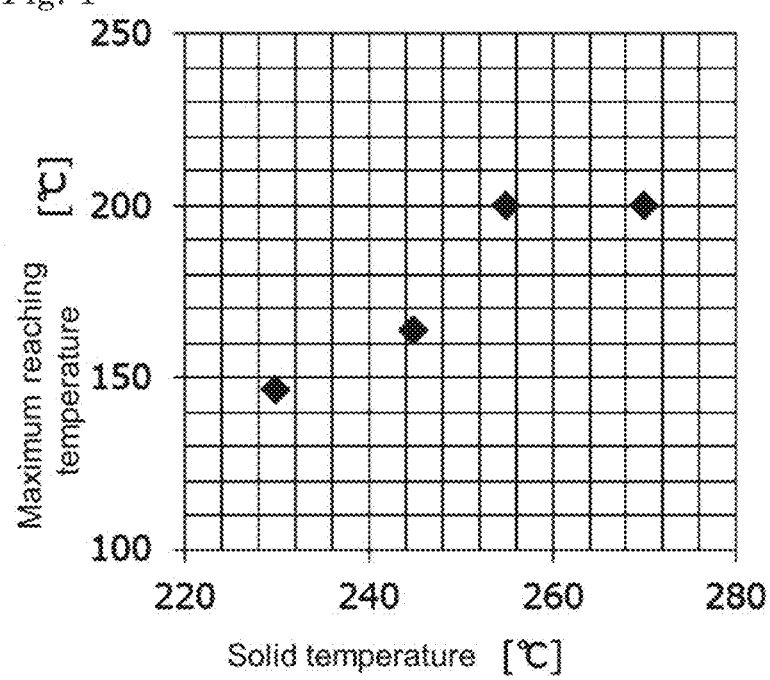
FIG. 1 is a graph showing the relationship between solid temperatures and maximum reaching temperatures in a self-heating property test of solid fuels.

One embodiment of the biomass solid fuel of the present invention is a biomass solid fuel obtained by molding pulverized biomass as a raw material, wherein mutual bonding or adhesion between the pulverized biomass particles is maintained and which has less than 200° C. of a maximum reaching temperature in a self-heating property test based on the "UNITED NATIONS Recommendations on the TRANSPORT OF DANGEROUS GOODS: Manual of Test and Criteria: $5^{th}$ revised Edition: Test method for Self-heating substances". Thus, the solid fuel is easy to transport and store.

The solid fuel of the present invention is a heated solid product obtained by the steps including a molding step of compressing and molding biomass that has been crushed and pulverized to a state of debris or powder into biomass blocks, and a heating step of heating the biomass blocks after the molding step. The molded solid product is used as a fuel (corresponding to PBT mentioned below). The biomass solid fuel of the present invention having a low maximum reaching temperature of less than 200° C. in a self-heating property test and having preferable properties (for example, water resistance and grindability) can be obtained by adjusting, for example, tree species of the biomass used as a raw material, a heating temperature in the heating step (sometimes referred to herein as "solid temperature") and the like. Proximate analysis (industrial analysis) value, ultimate analysis (elemental analysis) value, and high heating value in the present specification are based on JIS M 8812, 8813, and 8814. Herein, biomass as a raw material is also simply referred to as "raw material" or "biomass", the biomass blocks obtained by molding process before the heating step are also referred to as "unheated biomass blocks", and the obtained biomass solid fuel is also simply referred to as "solid fuel".

In one embodiment of the present invention, the biomass solid fuel has, for example, a volatile matter (dry ash free basis (also described as "daf")) of preferably 65.0 wt % or more, more preferably 68.0 wt % or more, and further more preferably 70.0 wt % or more, and the upper limit thereof is lower than the volatile matter (dry ash free basis) of the unheated solid fuel (unheated biomass block, corresponding to WP described later) obtained by molding pulverized biomass of the same raw material, and for example, 95 wt % or lower, preferably 88 wt % or less. As shown in the following examples, the inventor of the present invention has found that there is a correlation between the temperature rise due to the self-heating of the solid fuel and the amount of the volatile matter (dry ash free basis) of the solid fuel. That is, by adjusting the amount of the volatile matter (dry ash free basis) of the solid fuel, it is possible to suppress the maximum reaching temperature in the self-heating property test to less than 200° C.

In one embodiment of the present invention, the biomass solid fuel has, for example, a fuel ratio (fixed carbon/volatile matter) of preferably 0.45 or less, more preferably 0.42 or less, and further more preferably 0.40 or less. The lower limit thereof is more than the fuel ratio of the unheated solid fuel (unheated biomass blocks, corresponding to WP described later) obtained by molding pulverized biomass of the same raw material, and for example, 0.10 or more.

In one embodiment of the present invention, the biomass solid fuel has, for example, a high heating value (dry basis) of preferably 4500 to 7000 (kcal/kg), more preferably 4500 to 6000 (kcal/kg).

In one embodiment of the present invention, the biomass solid fuel has, for example, a molar ratio of oxygen O to carbon C (O/C) of preferably 0.440 to 0.700, more preferably 0.440 to 0.650, further more preferably 0.500 to 0.650, and still more preferably 0.500 to 0.600. A molar ratio of hydrogen H to carbon C (H/C) thereof is preferably 1.100 to 1.350.

In a biomass solid fuel of the present invention, the COD (Chemical Oxygen Demand) of an immersion water used for water immersion is preferably 3,000 mg/L or less, more preferably 1,000 mg/L or less. Here, the COD (Chemical Oxygen Demand) of an immersion water used for water immersion of a biomass solid fuel (simply, may be referred to as "COD") means a COD value assayed in accordance with JIS K0102 (2010)-17 for a sample of immersion water for COD determination prepared in accordance with Japan Environment Agency Announcement No. 13 "(A) a method for detecting a metal or the like contained in an industrial waste", 1973.

The biomass solid fuel obtained after the heating step has, but is not limited to, a Hardgrove grindability index (HGI) in accordance with JIS M 8801 of preferably 15 or more and 70 or less, and more preferably 20 or more and 60 or less. BET specific surface area thereof is preferably 0.10 $m^2$/g to 0.80 $m^2$/g, more preferably 0.11 $m^2$/g to 0.80 $m^2$/g, further more preferably 0.15 $m^2$/g to 0.80 $m^2$/g. In the biomass solid fuel of the present invention, mutual bonding or adhesion between pulverized biomass particles is maintained after immersion in water, and the equilibrium moisture content after immersion in water is preferably 10 to 65 wt %, more preferably 15 to 65 wt %, further more preferably 15 to 50 wt %, and still more preferably 15 to 45 wt %. When the biomass solid fuel has the physical properties within the above ranges, COD of a discharged water during storage can be reduced, disintegration can be reduced and handleability during storage can be improved.

A raw material of the biomass solid fuel of the present invention is not particularly limited, but in one embodiment, the raw material comprises at least one raw material selected from the group consisting of rubber tree; acacia; tree species of Dipterocarpaceae; *Pinus radiata*; a mixture of larch, spruce and birch; and a mixture of spruce, pine and fir. Larch, spruce and birch may be used alone as the raw material biomass, but it is preferable to be a mixture of two or more of these, more preferably to be a mixture of three of these. Spruce, pine and fir may be used alone as the raw material biomass, but it is preferable to be a mixture of two or more of these, more preferably to be a mixture of three of these. Since the biomass solid fuel of the present invention does not require a step of steam explosion and the use of a binder, the cost increase is suppressed.

In addition, raw materials may further comprise another tree species other than the above. In one embodiment of the present invention, the content of at least one raw material selected from the group consisting of rubber tree; acacia; tree species of Dipterocarpaceae; *Pinus radiata*; a mixture of larch, spruce and birch; and a mixture of spruce, pine and fir is preferably 50% by weight or more, more preferably 80% by weight or more, and may be 100% by weight in the total weight of biomass raw materials.

The particle size of the pulverized biomass particles is not particularly limited, but the average size is preferably about 100 μm to 3000 μm, and more preferably 400 m to 1000 μm. As the method of measuring the particle size of the pulverized biomass particles, known measurement methods may be used. As described later, since in the biomass solid fuel (PBT) of the present invention, mutual bonding or adhesion between the pulverized biomass particles is maintained by solid cross-linking, the particle size of the pulverized biomass particles is not particularly limited as long as it is within a moldable range. Further, since the fine pulverization becomes a cause of cost increase, the particle size may be within a known range as long as both of cost and moldability can stand together.

As described above, the biomass solid fuel of the present invention is produced by a method comprising a molding step and a subsequent heating step. In the molding step, the biomass blocks are formed by using known molding techniques. The biomass blocks are preferably in a form of pellet or briquette, and the size thereof is arbitrary. In the heating step, the molded biomass blocks are heated under an atmosphere having an oxygen concentration of 10% or less.

The method of manufacturing a biomass solid fuel of the present invention comprises a molding step of molding pulverized biomass particles of the biomass that has been crushed and pulverized to obtain unheated biomass blocks, and a heating step of heating the unheated biomass blocks to obtain a heated solid product, wherein a heating temperature in the heating step is preferably 170° C. to 400° C. The heating temperature is appropriately determined depending on biomass raw materials and the shape and size of the biomass blocks, but it is, for example, preferably 170 to 400° C., more preferably 200 to 350° C., further more preferably 230 to 300° C., particularly preferably 230 to 280° C. The heating time in the heating step is not particularly limited, but it is preferably 0.2 to 3 hours.

When A denotes the bulk density of the unheated biomass blocks before heating step and B denotes the bulk density of the heated solid product after the heating step, it is preferred that B/A=0.6 to 1. The value of the bulk density A is not particularly limited as long as it is within such a known range that unheated biomass blocks can be obtained by molding the pulverized biomass particles. The bulk density varies depending on the kind of biomass raw materials, and thus it may be appropriately set. The bulk density can be measured by the method described in Examples later. When H1 denotes HGI (Hardgrove grindability index of JIS M8801) of unheated biomass blocks and H2 denotes HGI of heated solid products, it is preferred that the H2/H1 (HGI ratio)=1.1 to 4.0 is satisfied, and more preferred that it is 1.1 to 2.5. By performing the heating so that one or both of the values of B/A (bulk density ratio) and H2/H1 (HGI ratio) is within the ranges, it is possible to obtain a biomass solid fuel having improved handleability during storage by reducing disintegration while reducing the COD in the discharged water during storage.

[Species of Biomass Raw Material and Properties of Solid Fuel]

Characteristics of the biomass solid fuel may be determined in a preferable range depending on tree species of biomass used as a raw material. Hereinafter, preferred ranges will be described about species of biomass raw materials and properties of the obtained solid fuels and their manufacturing method, respectively, but these are merely examples and the present invention is not limited thereto.

(Rubber Tree: Solid Fuel a)

As one embodiment of the present invention, when a raw material comprises rubber tree, the properties of a biomass solid fuel (hereinafter, may be referred to as a solid fuel a) are as follows. In the raw material of the solid fuel a, the content of rubber tree is preferably 50 wt % or more, more preferably 70 wt % or more, further more preferably 80 wt % or more, and may be 100 wt %.

A maximum reaching temperature of the solid fuel a is less than 200° C. in a self-heating property test based on the "UNITED NATIONS Recommendations on the TRANSPORT OF DANGEROUS GOODS: Manual of Test and Criteria: $5^{th}$ revised Edition: Test method for Self-heating substances" (herein, simply referred to as "self-heating property test").

The volatile matter (dry ash free basis) of the solid fuel a is preferably 74.0 wt % or more, more preferably 75.0 wt % or more, further more preferably 76.0 wt % or more, and still more preferably more than 80.1 wt %. It is preferably less than 83.0 wt %. When the volatile matter (dry ash free basis) is within the range, the solid fuel a in which self-heating property is suppressed is easily obtained.

The BET specific surface area thereof is preferably 0.350 $m^2/g$ to 0.442 $m^2/g$.

The HGI thereof is preferably 20 to 34, and more preferably 25 to 33. HGI ratio is preferably 1.1 to 2.5, and more preferably 1.5 to 2.0.

The fuel ratio thereof is preferably 0.37 or less, more preferably 0.365 or less, further more preferably 0.34 or less, and still more preferably 0.32 or less. The lower limit is not particularly limited, but is preferably more than 0.21, more preferably 0.25 or more.

The high heating value (dry basis) thereof is preferably 4650 to 5180 kcal/kg, more preferably 4700 to 5150 kcal/kg, further more preferably 4750 to 5050 kcal/kg and still more preferably 4885 kcal/kg or more.

The molar ratio of oxygen O to carbon C (O/C) thereof is preferably 0.50 to 0.65, and more preferably 0.50 to 0.60.

The molar ratio of hydrogen H to carbon C (H/C) thereof is preferably 1.145 to 1.230, and more preferably 1.145 to 1.220. When O/C and H/C are within the above ranges, the solid fuel a having a maximum reaching temperature of less than 200° C. in the self-heating property test is easily obtained.

The solid yield thereof (the calculation method is referred to the Examples described later, and the same applies hereinafter) is preferably 77 wt % or more, more preferably 80 wt % or more, further more preferably 83 wt % or more, still more preferably 88 wt % or more. The upper limit is not particularly limited, but is preferably 95 wt % or less.

The foregoing description is the preferred range of properties of the solid fuel a.

In addition, when manufacturing the solid fuel a, the heating temperature in the heating step is not particularly limited, but it is preferably 170° C. to 254° C., more preferably 200° C. to 254° C., and further more preferably 225° C. to 254° C.

(Acacia: Solid Fuel b)

As one embodiment of the present invention, when a raw material comprises acacia, the properties of a biomass solid fuel (hereinafter, may be referred to as a solid fuel b) are as follows. In the raw material of the solid fuel b, the content of acacia is preferably 50 wt % or more, more preferably 70 wt % or more, further more preferably 80 wt % or more, and may be 100 wt %.

A maximum reaching temperature of the solid fuel b is less than 200° C. in a self-heating property test.

The volatile matter (dry ash free basis) of the solid fuel b is preferably 77.5 wt % or more, more preferably 77.8 wt % or more, and further more preferably 78.0 wt % or more. It is preferably less than 83.1 wt %. When the volatile matter (dry ash free basis) is within the range, the solid fuel b in which self-heating property is suppressed is easily obtained.

The HGI thereof is preferably 25 to 60, and more preferably 35 to 55. HGI ratio is preferably 1.35 to 3.5, and more preferably 1.5 to 3.2.

The BET specific surface area thereof is preferably 0.250 $m^2/g$ to 0.500 $m^2/g$, more preferably 0.300 $m^2/g$ to 0.480 $m^2/g$, further more preferably 0.350 $m^2/g$ to 0.450 $m^2/g$.

The fuel ratio thereof is preferably 0.285 or less, and more preferably 0.280 or less. It is preferably more than 0.20.

The high heating value (dry basis) thereof is preferably 4800 to 5260 kcal/kg, more preferably 4900 to 5260 kcal/kg, and further more preferably 4900 to 5250 kcal/kg.

The molar ratio of oxygen O to carbon C (O/C) thereof is preferably 0.52 to 0.62, and more preferably 0.52 to 0.60. The molar ratio of hydrogen H to carbon C (H/C) thereof is preferably 1.205 to 1.300, and more preferably 1.205 to 1.290.

The solid yield thereof is preferably 84.0 wt % or more, more preferably 84.5 wt % or more, further more preferably 85.0 wt % or more. The upper limit is not particularly limited, but is preferably 95 wt % or less.

The foregoing description is the preferred range of properties of the solid fuel b.

In addition, when manufacturing the solid fuel b, the heating temperature in the heating step is not particularly limited, but it is preferably 170 to 252° C., more preferably 200 to 252° C., and further more preferably 225 to 252° C.

(Dipterocarpaceae: Solid Fuel c)

As one embodiment of the present invention, when a raw material comprises tree species of Dipterocarpaceae, the properties of a biomass solid fuel (hereinafter, may be referred to as a solid fuel c) are as follows. In the raw material of the solid fuel c, the content of Dipterocarpaceae is preferably 50 wt % or more, more preferably 70 wt % or more, further more preferably 80 wt % or more, and may be 100 wt %. Examples of the tree species of Dipterocarpaceae include selangan batu, meranti, keruing and kapur. The solid fuel c may further comprise biomass raw materials belonging to a family other than Dipterocarpaceae. The biomass belonging to a family other than Dipterocarpaceae is not particularly limited, but is preferably a tropical broad-leaved tree including Leguminosae such as sepetir and merbau and Malvaceae such as scaphium.

A maximum reaching temperature of the solid fuel c is less than 200° C. in a self-heating property test.

The volatile matter (dry ash free basis) of the solid fuel c is preferably 77.2 wt % or more, more preferably 77.5 wt % or more, further more preferably 78.0 wt % or more, and still more preferably 78.5 wt % or more. It is preferably less than 84.4 wt %. When the volatile matter (dry ash free basis) is within the range, the solid fuel c in which self-heating property is suppressed is easily obtained.

The HGI thereof is preferably 25 to 60, and more preferably 30 to 60. HGI ratio is preferably 1.05 to 3.0, and more preferably 1.2 to 3.0.

The BET specific surface area thereof is preferably 0.250 to 0.400 $m^2/g$, and more preferably 0.300 to 0.400 $m^2/g$.

The fuel ratio thereof is preferably 0.295 or less, more preferably 0.29 or less, and more further preferably 0.28 or less. It is preferably more than 0.18.

The high heating value (dry basis) thereof is preferably 4800 to 5300 kcal/kg, more preferably 4900 to 5300 kcal/kg, and further more preferably 4950 to 5270 kcal/kg.

The molar ratio of oxygen O to carbon C (O/C) thereof is preferably 0.515 to 0.620, more preferably 0.520 to 0.620, and further more preferably 0.545 to 0.620.

The molar ratio of hydrogen H to carbon C (H/C) thereof is preferably 1.21 to 1.30.

The solid yield thereof is preferably 84.5 wt % or more, more preferably 85.0 wt % or more, further more preferably 85.5 wt % or more, and still more preferably 87.8 wt % or more. The upper limit is not particularly limited, but is preferably 95 wt % or less.

The foregoing description is the preferred range of properties of the solid fuel c.

In addition, when manufacturing the solid fuel c, the heating temperature in the heating step is not particularly limited, but it is preferably 170 to 259° C., more preferably 200 to 259° C., and further more preferably 225 to 259° C.

(*Pinus radiata*: Solid Fuel d)

As one embodiment of the present invention, when a raw material comprises *Pinus radiata*, the properties of a biomass solid fuel (hereinafter, may be referred to as a solid fuel d) are as follows. In the raw material of the solid fuel d, the content of *Pinus radiata* is preferably 50 wt % or more, more preferably 70 wt % or more, further more preferably 80 wt % or more, and may be 100 wt %.

A maximum reaching temperature of the solid fuel d is less than 200° C. in a self-heating property test.

The volatile matter (dry ash free basis) of the solid fuel d is preferably 77.5 wt % or more, more preferably 77.8 wt % or more, and further more preferably 78.0 wt % or more. It is preferably less than 87.2 wt %. When the volatile matter (dry ash free basis) is within the range, the solid fuel d in which self-heating property is suppressed is easily obtained.

The BET specific surface area thereof is preferably 0.250 $m^2/g$ to 0.350 $m^2/g$, more preferably 0.250 $m^2/g$ to 0.333 $m^2/g$, further more preferably 0.250 $m^2/g$ to 0.330 $m^2/g$.

The HGI thereof is preferably 25 to 45, and more preferably 30 to 40. HGI ratio is preferably 1.01 to 2.0, and more preferably 1.2 to 1.7.

The fuel ratio thereof is preferably 0.295 or less, more preferably 0.290 or less, and further more preferably 0.285 or less. It is preferably more than 0.15.

The high heating value (dry basis) thereof is preferably 4800 to 5440 kcal/kg, more preferably 4900 to 5440 kcal/kg, and further more preferably 5000 to 5440 kcal/kg.

The molar ratio of oxygen O to carbon C (O/C) thereof is preferably 0.505 to 0.650, and more preferably 0.505 to 0.600. The molar ratio of hydrogen H to carbon C (H/C) thereof is preferably 1.18 to 1.35, and more preferably 1.18 to 1.30.

The solid yield thereof is preferably 80.0 wt % or more, more preferably 80.5 wt % or more, and further more preferably 81.0 wt % or more. The upper limit is not particularly limited, but is preferably 95 wt % or less.

The foregoing description is the preferred range of properties of the solid fuel d.

In addition, when manufacturing the solid fuel d, the heating temperature in the heating step is not particularly limited, but it is preferably 170 to 274° C., more preferably 200 to 274° C., and further more preferably 230 to 274° C.

(Mixture of Larch, Spruce and Birch: Solid Fuel e)

As one embodiment of the present invention, when a raw material comprises a mixture of larch, spruce and birch, the properties of a biomass solid fuel (hereinafter, may be referred to as a solid fuel e) are as follows. The mixing ratio of larch, spruce and birch is not particularly limited, but for example, it may be mixed so that the weight ratio satisfies larch:spruce:birch=30 to 70:25 to 65:0 to 25. In the raw material of the solid fuel e, the content of the mixture of larch, spruce and birch is preferably 50 wt % or more, more preferably 70 wt % or more, further more preferably 80 wt % or more, and may be 100 wt %.

A maximum reaching temperature of the solid fuel e is less than 200° C. in a self-heating property test.

The volatile matter (dry ash free basis) of the solid fuel e is preferably 71.0 wt % or more, more preferably 73.0 wt % or more, and further more preferably 76.0 wt % or more. It is preferably less than 85.9 wt %. When the volatile matter (dry ash free basis) is within the range, the solid fuel e in which self-heating property is suppressed is easily obtained.

The BET specific surface area thereof is preferably 0.120 $m^2/g$ to 0.250 $m^2/g$, and more preferably 0.150 $m^2/g$ to 0.250 $m^2/g$, further more preferably 0.150 $m^2/g$ to 0.230 $m^2/g$, and more still more preferably 0.155 $m^2/g$ to 0.230 $m^2/g$.

The HGI thereof is preferably 18 to 40, and more preferably 20 to 35. HGI ratio is preferably 1.01 to 2.5, and more preferably 1.15 to 2.2.

The fuel ratio thereof is preferably 0.405 or less, more preferably 0.35 or less, and further more preferably 0.30 or less. It is preferably more than 0.16.

The high heating value (dry basis) thereof is preferably 4800 to 5700 kcal/kg, more preferably 4800 to 5600 kcal/kg, and further more preferably 4900 to 5500 kcal/kg.

The molar ratio of oxygen O to carbon C (O/C) thereof is preferably 0.44 to 0.64, and more preferably 0.50 to 0.63. The molar ratio of hydrogen H to carbon C (H/C) thereof is preferably 1.10 to 1.30.

The solid yield thereof is preferably 71.0 wt % or more, more preferably 75.0 wt % or more, and further more preferably 78.0 wt % or more. The upper limit is not particularly limited, but is preferably 95 wt % or less.

The foregoing description is the preferred range of properties of the solid fuel e.

In addition, when manufacturing the solid fuel e, the heating temperature in the heating step is not particularly limited, but it is preferably 170 to 289° C., more preferably 200 to 285° C., and further more preferably 220 to 280° C.

(Mixture of Spruce, Pine and Fir: Solid Fuel f)

As one embodiment of the present invention, when a raw material comprises a mixture of spruce, pine and fir, the properties of a biomass solid fuel (hereinafter, may be referred to as a solid fuel f) are as follows. The mixing ratio of spruce, pine and fir is not particularly limited, but for example, it may be mixed so that the weight ratio satisfies spruce:pine:fir=20 to 40:30 to 60:10 to 40. In the raw material of the solid fuel f, the content of the mixture of spruce, pine and fir is preferably 50 wt % or more, more preferably 70 wt % or more, further more preferably 80 wt % or more, and may be 100 wt %.

A maximum reaching temperature of the solid fuel f is less than 200° C. in a self-heating property test.

The volatile matter (dry ash free basis) of the solid fuel f is preferably 74.3 wt % or more, more preferably 74.5 wt % or more, and further more preferably 75.0 wt % or more. It is preferably less than 85.6 wt % and more preferably 85.0 wt % or less. When the volatile matter (dry ash free basis) is within the range, the solid fuel f in which self-heating property is suppressed is easily obtained.

The BET specific surface area thereof is preferably 0.200 $m^2/g$ to 0.317 $m^2/g$, and more preferably 0.230 $m^2/g$ to 0.317 $m^2/g$.

The HGI thereof is preferably 19 to 39, and more preferably 20 to 38. HGI ratio is preferably 1.20 to 2.20, and more preferably 1.50 to 2.10.

The fuel ratio thereof is preferably 0.34 or less, and more preferably 0.33 or less. It is preferably more than 0.17, and more preferably 0.18 or more.

The high heating value (dry basis) thereof is preferably 4800 to 5560 kcal/kg, more preferably 4800 to 5550 kcal/kg, and further more preferably 4900 to 5500 kcal/kg.

The molar ratio of oxygen O to carbon C (O/C) thereof is preferably more than 0.47 and 0.61 or less, and more preferably 0.48 to 0.60. The molar ratio of hydrogen H to carbon C (H/C) thereof is preferably more than 1.10 and 1.26 or less, and more preferably 1.11 to 1.25.

The solid yield thereof is preferably 75.5 wt % or more, more preferably 76.0 wt % or more, further more preferably 76.5 wt % or more. The upper limit is not particularly limited, but is preferably 95 wt % or less.

The foregoing description is the preferred range of properties of the solid fuel f.

In addition, when manufacturing the solid fuel f, the heating temperature in the heating step is not particularly limited, but it is preferably 170° C. or more and less than 280° C., more preferably 200 to 279° C., and further more preferably 220 to 279° C.

As described above, the biomass solid fuel of the present invention is a biomass solid fuel which has low self-heating property and is easy to transport and store, and has good properties as a fuel.

The inventors of the present invention presume that, in the method of manufacturing the biomass solid fuel, because the method has such an order of the steps that the heating step of heating the unheated biomass blocks is performed after the molding step, mutual bonding or adhesion between the pulverized biomass particles is maintained by using components originated from the raw material biomass without using a binder, which enables the production of biomass solid fuels having high water-resistant which do not disintegrate by immersion in water. According to the analysis of the present inventors, the following findings are obtained regarding the mechanism that the biomass solid fuels acquire water resistance.

Figure 9:
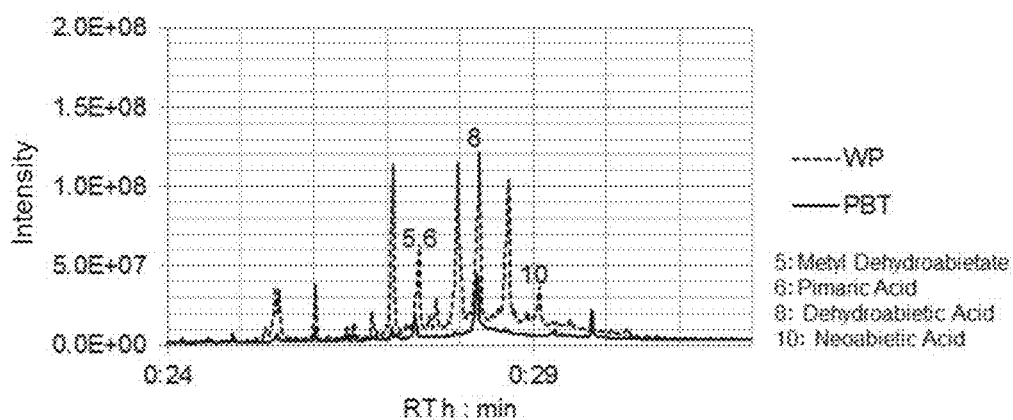
FIG. 9 is a chart showing the results of GC-MS analysis of acetone extract solution of the solid fuels.

The present inventors performed FT-IR analysis, GC-MS analysis, and SEM observation about three types of biomass solid fuels manufactured by different production methods, specifically an unheated solid fuel obtained by molding pulverized biomass particles (White Pellet: may be referred to as "WP"), and a solid fuel obtained by heating after molding pulverized biomass particles (Pelletizing Before Torrefaction; may be referred to as "PBT"), and analyzed the mechanism of water resistance of the biomass solid fuels. Herein, binders were not used either in WP or PBT. FIGS. 5 to 8 show examples of the results of FT-IR analysis of biomass solid fuels, and FIG. 9 shows the result of GC-MS analysis of acetone extract solution of biomass solid fuel (for details, refer to Examples).

First, acetone extracts of the respective solid fuels were analyzed by FT-IR. In the PBT obtained through the heating step, content of hydrophilic COOH groups is in small, but content of C═C bond is large as compared with the unheated WP. This suggests that the chemical structure of the components constituting the biomass has changed and has become hydrophobic by heating.

In addition, the acetone extract components of the respective solid fuels were analyzed by GC-MS analysis. It is suggested that terpenes such as abietic acid and derivatives thereof (hereinafter, may be referred to as "abietic acid and the like") have thermally decomposed by heating, and this fact relates to the water resistance of the biomass solid fuel. The abietic acid and the like are main components of rosins contained in pine and the like.

Figure 4:
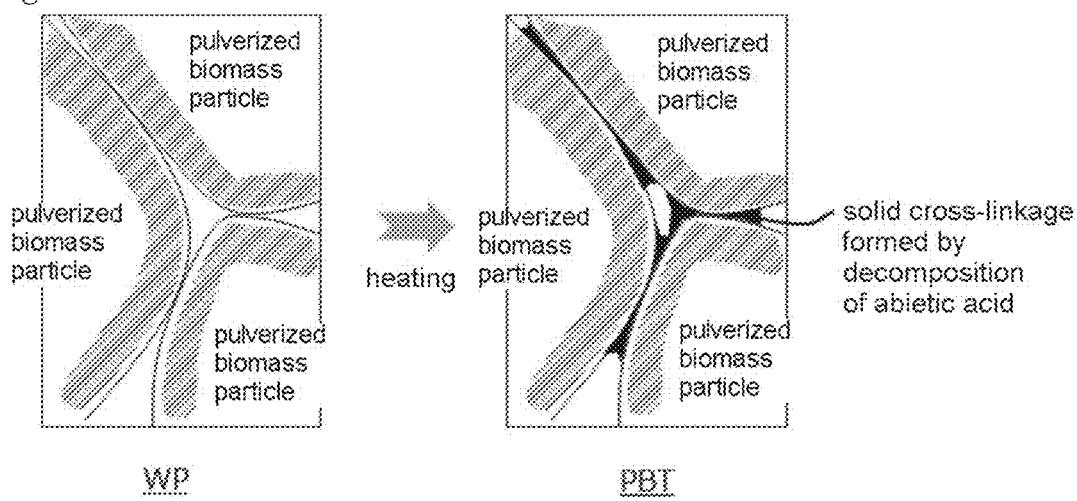
FIG. 4 is a diagram showing (estimated) mechanism of the development of solid cross-links in PBT.
Figure 5:
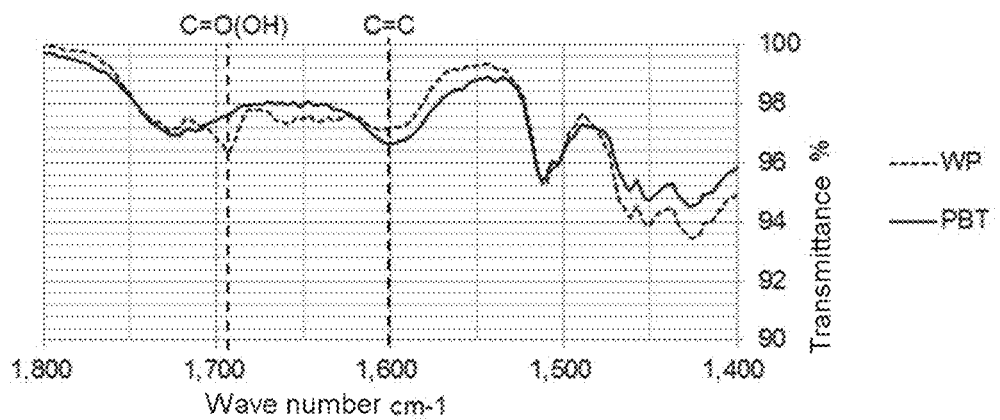
FIG. 5 is a chart showing the results of FT-IR analysis of the outer surface of pellets of the solid fuels.
Figure 6:
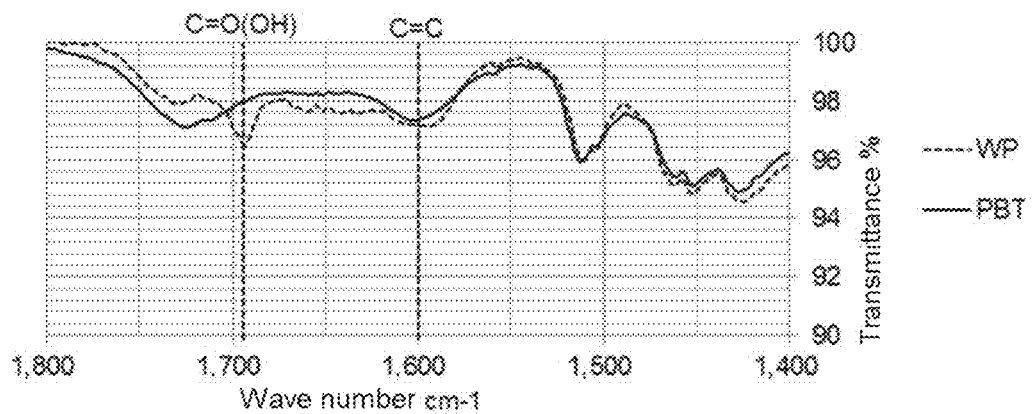
FIG. 6 is a chart showing the results of FT-IR analysis of the cross-sectional center of pellets of the solid fuels.
Figure 7:
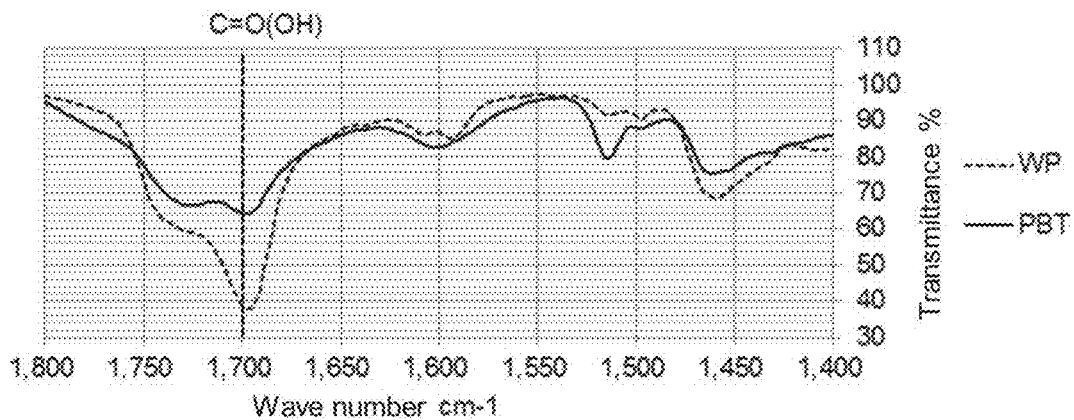
FIG. 7 is a chart showing the results of FT-IR analysis of acetone extract solution of the solid fuels.
Figure 8:
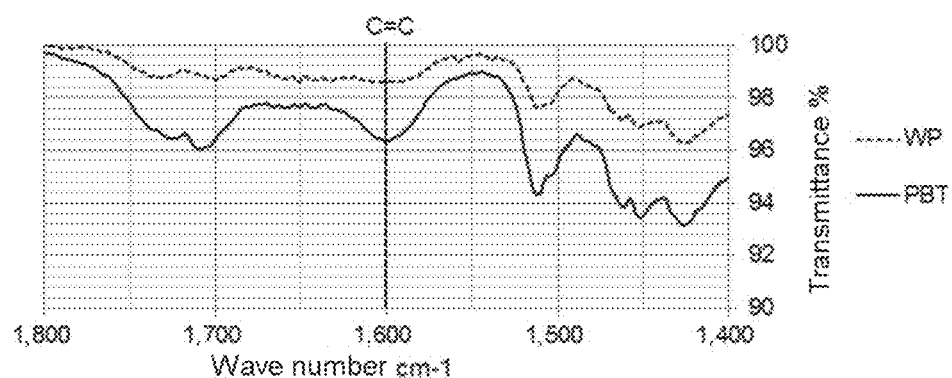
FIG. 8 is a chart showing the results of FT-IR analysis of the solid of solid fuels after acetone extract.

FIG. 4 is a diagram illustrating a (estimated) mechanism of the development of solid cross-linking in PBT. In the case of PBT, in the heating step after the molding step, melted liquid of the abietic acid elutes in the gap between biomass (the gap between adjacent pulverized biomass particles that have been compacted by molding after pulverizing; herein the biomass may be also referred to as "pulverized biomass") with the rise of temperature, and the evaporation and thermal decomposition of abietic acid take place to form hydrophobic materials, which are fixed in the gap between the pulverized biomass particles to develop cross-linkage (solid cross-linkage). Thus, without the addition of a binder, mutual bonding or adhesion between the pulverized biomass particles is maintained by the abietic acid and the like derived from biomass raw material. Thus, it is speculated that because pulverized biomass particles are connected or bonded to each other to prevent water penetration, water resistance is improved.

On the other hand, in the case of WP which is unheated and obtained only by molding pulverized biomass particles, no solid cross-linkage of the pulverized biomass between powder particles exists unlike the above PBT. Since there are a lot of hydrophilic COOH group and the like on the surface of raw pulverized biomass particles constituting the WP, water easily enters. The penetrated water expands the gap between the pulverized biomass particles wider, and thus, the molded pellets and the like disintegrate easily.

Furthermore, in the case of solid fuels molded after heating the pulverized biomass particles (Pelletizing After Torrefaction; hereinafter may be referred to as PAT), the individual pulverized biomass particles themselves become hydrophobic on the surface due to elution of abietic acid, etc. However, since the pulverizing and molding is performed after they become hydrophobic by heating, formation of the cross-linkage between the pulverized biomass particles are not expected unlike the above PBT. Therefore, in the case of PAT in which heating is performed before the molding, water easily penetrates into the gap between the compacted pulverized biomass particles, and thus it has poor water resistance as compared with PBT.

The melting point of abietic acid or derivatives thereof is about 139 to 142° C., and the boiling point is about 250° C. Thus, abietic acid and the like melt by heating at temperature near the melting point to form liquid cross-linkage, and abietic acid and the like decompose thermally at temperature near the boiling point to develop the formation of solid cross-linkage.

It should be noted that terpenes, including abietic acid, are contained in biomass in general (see, Hokkaido Forest Products Research Institute monthly report 171, April 1966, Public Interest Incorporated Association Japan Wood Protection Association, "Wood Preservation" Vol. 34-2 (2008), etc.). Although there are small differences in content depending on the type of biomass (see, "use of essential oil", Ohira Tatsuro, Japan Wood Society the 6th Research Sub-committee Report p 72, Table 1, Japan Wood Society 1999, etc.), all of Examples described below showed the generation of water resistance by heating 230° C. or higher (disintegration does not occur even after immersion in water, see Table 2), and therefore it is considered that the heating the biomass in general at temperature at least 230° C. or higher to 250° C. or higher provides water resistance.

In addition, in the case of PBT, the strength of the solid fuel is improved due to the development of the solid cross-linking, and therefore it is presumed that good grindability (HGI, ball mill grindability) and good handleability (mechanical durability and disintegration tests) is obtained without the addition of a binder, by heating at least 230° C. or higher to 250° C. or higher as similar to the water resistance. As mentioned above, COD is reduced when PBT is used. This is considered because the tar component of the biomass raw material volatilizes by heating, and at the same time the solidified abietic acid and the like covers the surface of solid fuel PBT, which further increases hydrophobicity of the surface of the solid fuel to prevent the elution of tar component remaining in the biomass raw material.

As shown in FIG. 1 and the Examples described later, as the heating temperature (also described as "solid temperature" or "target temperature") in the heating step at the time of producing biomass solid fuel (PBT) increases, the maximum reaching temperature in the self-heating property test tends to be higher. The inventor of the present invention investigated in detail the relationship between the solid temperature and the self-heating property, and thereby obtained the following findings.

Figure 2:
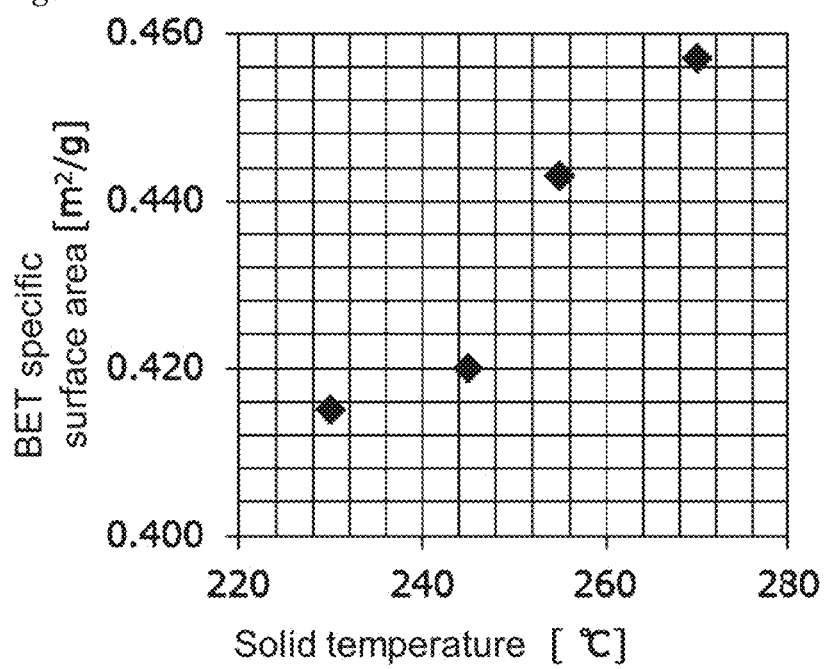
FIG. 2 is a graph showing the relationship between solid temperatures and BET specific surface areas of solid fuels.
Figure 3A:
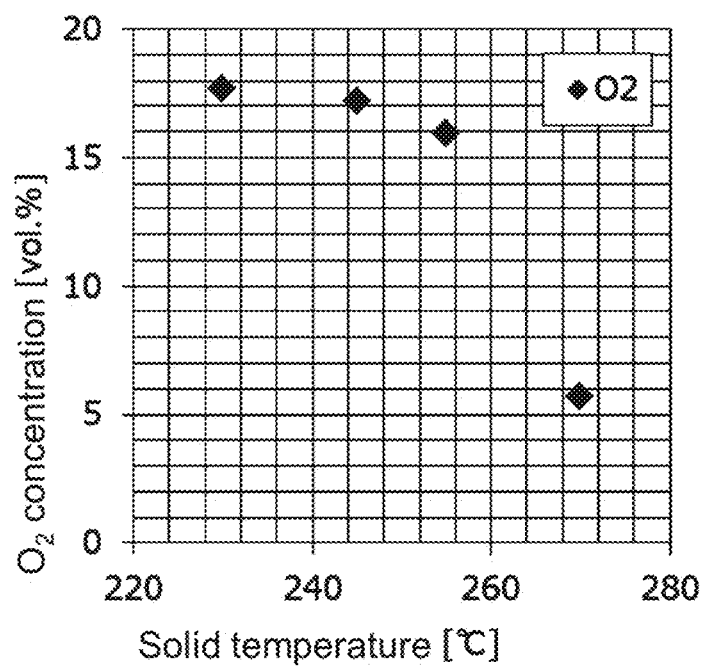
FIG. 3A is a graph showing the relationship between solid temperatures of solid fuels and concentrations of generated $O_2$ gas in a generated gas analysis.
Figure 3B:
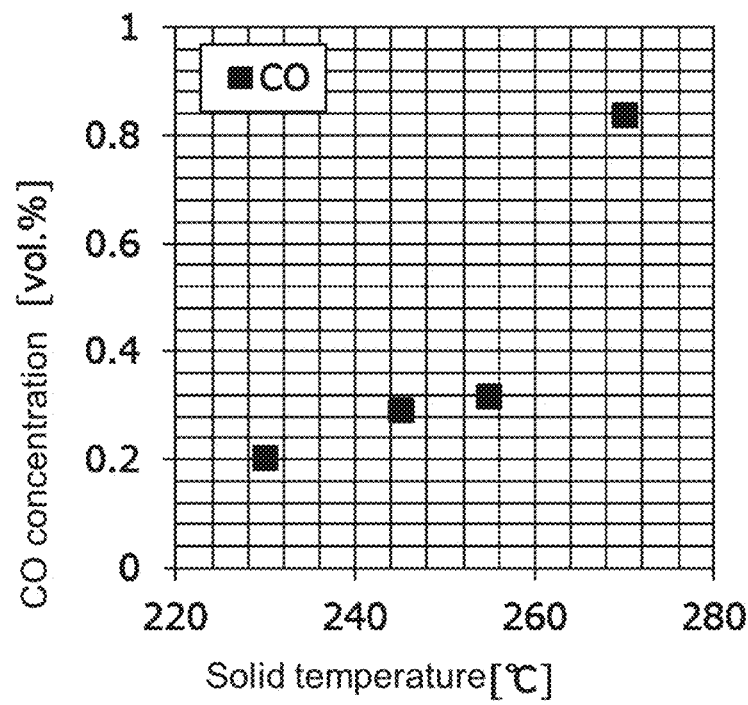
FIG. 3B is a graph showing the relationship between solid temperatures of solid fuels and concentrations of generated CO gas in a generated gas analysis.
Figure 3C:
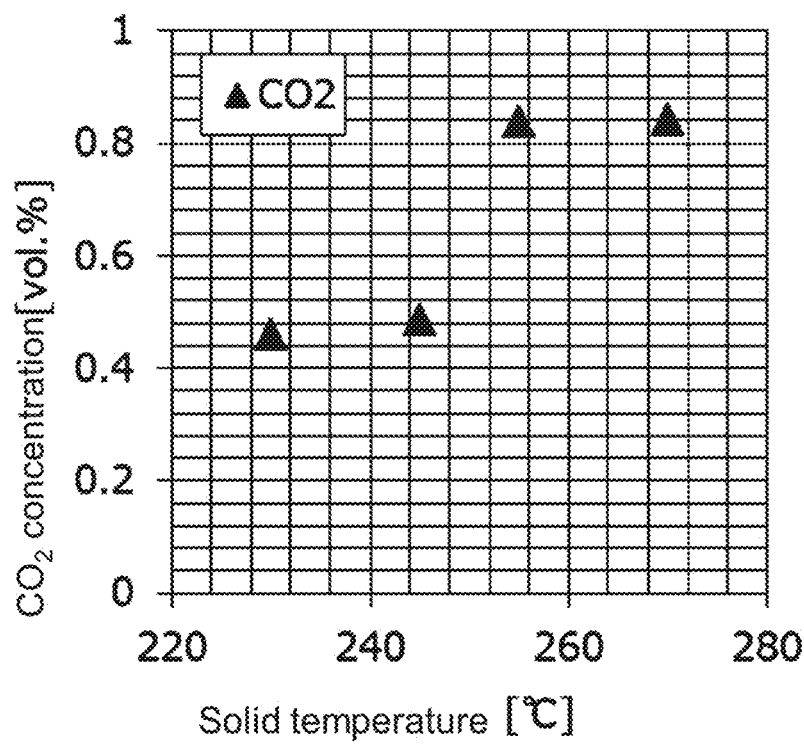
FIG. 3C is a graph showing the relationship between solid temperatures of solid fuels and concentrations of generated $CO_2$ gas in a generated gas analysis.

As the solid fuel solid temperature increases, the BET specific surface area of the solid fuel increases (FIG. 2). The reason for this is presumed that with a rise of the solid temperature, the thermal decomposition of the solid fuel proceeds and the volatile matter is reduced, and the pores develop on the surface of the solid fuel so that the solid fuel becomes porous. According to the investigation in detail of the gas generated from each solid fuel, it was shown that as the solid temperature increases, the amount of $O_2$ adsorbed to the surface of the solid fuel is increased because the $O_2$ concentration in the generated gas decreases (FIG. 3A). On the other hand, as the solid temperature increased, the concentrations of CO and $CO_2$ increase, and it was suggested that the oxidation reaction (exothermic reaction) proceeds by the adsorbed $O_2$ (FIG. 3B and FIG. 3C). FIGS. 1 to 3C show the analysis results in the case of using rubber tree as a raw material, but similar results were also obtained when using *Pinus radiata* as a raw material (for details, see Examples described later).

From these results, the following reaction mechanism may be considered for the relationship between the solid temperature of the solid fuel and the self-heating property. First, while the heating temperature during producing the solid fuel is increased, thermal decomposition proceeds in the solid fuel, the volatile matter decreases, the pellet surface becomes porous, and the BET specific surface area increases. As a result, the amount of $O_2$ adsorbed to the surface of the solid fuel is increased, and thereby the oxidation reaction (exothermic reaction) proceeds. Therefore, it is presumed that when the solid temperature exceeds a certain temperature, the heat storage amount exceeds the heat radiation amount, and thereby the maximum reaching temperature in the self-heating property test becomes 200° C. or more.

EXAMPLE

Hereinafter, the present invention will be specifically described with reference to Examples, but the present invention is not limited thereto.

Abbreviations used in the present specification are as follows.
FC: fixed carbon
VM: volatile matter
HHV: high heating value (dry basis)
HGI: Hardgrove grindability index
AD: air dried basis
daf dry ash free basis
dry: dry basis The analysis method conducted in the Examples for each biomass solid fuel is described below.

<Before Immersion in Water>

[Yield]

Solid yield is a weight ratio before and after heating (100×dry weight after heating/dry weight before heating (%)), and thermal yield is a ratio of heating value before and after heating (high heating value after heating (dry basis)× solid yield/high heating value before heating (dry basis)). As mentioned later, temperature was not maintained at the target temperature (heating temperature) in each Example.

Furthermore, a high heating value (dry basis), a fuel ratio calculated based on proximate analysis values (air dried basis), and results of ultimate analysis values (dry basis) and molar ratios of oxygen O, carbon C and hydrogen H obtained based on the ultimate analysis were calculated. HGI is based on JIS M 8801 as described above, and the larger value indicates better grindability. HGI ratio is calculated by HGI after heating/HGI before heating. In Tables 1A, 1B and 3A described later, "HHV" is a high heating value (dry basis), "FC" is a fixed carbon (air dried basis), "VM" is a volatile matter (AD is air dried basis and daf is dry ash free basis), and the fuel ratio is a value calculated by "FC (AD)/VM (AD)".

[BET Specific Surface Area]

BET specific surface area was determined using an automatic specific surface area/pore size distribution measuring apparatus (Nippon Bell Co., Ltd. BELSORP-min II) for each solid fuel that had been cut into a size of 2 to 6 mm, filled in a container, and degassed in vacuo for 2 hours at 100° C. as a pretreatment. Nitrogen gas was used as an adsorption gas.

[Ball Mill Grindability]

The pulverizing time of each biomass solid fuel was 20 minutes, and 150 μm sieve-passed weight ratio after 20 minutes was determined as pulverizing point. Herein, measuring was carried out by using a ball mill conforming to JIS M4002, wherein into a cylindrical container having an inner diameter of 305 mm×axial length of 305 mm, normal grade ball bearings as defined in JIS B1501 (136.5 mm×43 balls, Φ30.2 mm×67 balls, Φ24.4 mm×10 balls, Φ19.1 mm×71 balls and Φ15.9 mm×94 balls) was charged and the container was rotated at a speed of 70 rpm. The higher value indicates that the grindability is improved.

[Dimension Before Immersion in Water (Diameter and Length)]

The pellet length (L1 (mm)) and the pellet diameter (φ1 (mm)) of each solid fuel before immersion in water were measured. For the pellet length, ten pellets before the immersion were randomly chosen for each solid fuel, and their length was measured by an electronic caliper (manufactured by Mitutoyo: CD-15CX, repeating precision is 0.01 mm and the second decimal place was rounded.). In case that the pellet end was diagonal, the length up to the most distal end portion was measured. The pellet diameter was also measured using the same electronic caliper. Measured values of pellet length and pellet diameter are average values of 10 pellets.

[Solid Strength Before Immersion in Water (Mechanical Durability)]

For each solid fuel, mechanical durability DU was determined based on the following equation in accordance with the United States agriculture industry's standard ASAE S 269.4 and German Industrial Standard DIN EN 15210-1. In the equation, m0 is a sample weight before rotation treatment, m1 is a sieve-on weight of sample after the rotation treatment, wherein the sieve used was a plate sieve having circle holes with 3.15 mm diameter.

$$DU=(m1/m0)\times 100$$

[Bulk Density]

For each solid fuel, according to the UK national standard BS EN15103: 2009, the bulk density BD is calculated by the following formula:

$$BD=(m2-m1)/V.$$

For the measurement, a container having an inner diameter of 167 mm×a height of 228 mm was used. In the formula, m1 is a container weight, m2 is the total of a container weight and a sample weight, and V is a container volume.

<After Immersion in Water>

The measurement method for COD in the immersion water when the biomass solid fuels were immersed in water, and measurement methods for the diameter, length, pH, moisture content of the solid, and mechanical durability after the biomass solid fuels are immersed in water for 168 hours are as follows.

[COD]

COD (chemical oxygen demand) in the immersion water was determined when each biomass solid fuel was immersed in water. A sample of immersion water for COD determination was prepared in accordance with Japan Environment Agency Announcement No. 13 "(A) a method for detecting a metal or the like contained in an industrial waste", 1973, and COD was analyzed in accordance with JIS K0102 (2010)-17.

[Dimension after Immersion in Water (Diameter and Length)]

The pellet length (L2 (mm)) and the pellet diameter (φ2 (mm)) of each solid fuel after immersion in water were measured. For the pellet length, ten pellets before the immersion were randomly chosen for each solid fuel, and their length was measured by an electronic caliper (manufactured by Mitutoyo: CD-15CX, repeating precision is 0.01 mm and the second decimal place was rounded.). In case that the pellet end was diagonal, the length up to the most distal end portion was measured. The pellet diameter was also measured using the same electronic caliper. Measured values of pellet length and pellet diameter are average values of 10 pellets.

[pH]

Each solid fuel was immersed in water at solid-liquid ratio of 1:3, and pH values were measured.

[Moisture Content of the Solid after Immersion in Water]

The solid fuel of each Example was immersed in water, taken out after 168 hours, and the moisture on the solid surface was wiped with a waste cloth to measure moisture content of the solid. The moisture content was calculated by the formula:

100×(weight of the solid after immersion in water−dry weight of the solid after immersion in water)/weight of the solid after immersion in water.

[Mechanical Durability after Immersion in Water]

Mechanical durability of each example pellet after immersion in water for 168 hours was measured by the same method as before immersion in water.

[Self-Heating Property]

Self-heating property was evaluated based on "UNITED NATIONS Recommendations on the TRANSPORT OF DANGEROUS GOODS: Manual of Test and Criteria: 5$^{th}$ revised Edition: Test method for Self-heating substances". The biomass solid fuel was charged into a sample container (stainless steel mesh cube with a side length of 10 cm) and the sample container was suspended inside of a thermostat oven at a temperature of 140° C., and the temperature of the material was measured for 24 hours continuously. The highest temperature thereof was defined as the "maximum reaching temperature". Material in which ignition or temperature rise to 200° C. or more is observed is determined as a self-heating material.

In the following Example a to Example f, biomass solid fuels were produced by the following production methods, respectively. In addition, in all of the examples and comparative examples, no binder is used for producing biomass solid fuels. The properties and the like of these solid fuels are shown in Tables 1A, 1B, 2, 3A and 3B.

Example a: Rubber Tree

In the following Examples a1 to a5 and Comparative Examples a1 to a3, biomass solid fuels were produced using rubber tree as a biomass raw material as described below.

Examples a1 to a5, Comparative Examples a2 to a3

A biomass solid fuel (PBT) was obtained through a molding step of pulverizing biomass after crushing and molding the pulverized biomass particles, and subsequent heating step. The binder is not used in any step. In the molding process of each Example, the pulverized biomass was molded into a pellet shape with a diameter of 7.5 mm. In the heating step of each Example, 4 kg of raw material (molded biomass) was charged in an electric batch furnace having 600 mm diameter and heated to target temperatures (heating temperatures in Table 1A) in respective Examples with a heating rate of 2° C./min, and heating was performed with an oxygen concentration of 5% or less while purging nitrogen. Hereinafter, the target temperature and the heating temperature refer to the same meaning. In Examples a1 to a5 and Comparative Examples a2 and a3, temperatures were not maintained at the target temperature (heating temperature) (this also applies to the following Examples b to f). Table 1A and Table 2 show the heating temperatures in the heating step and the properties of the resulting biomass solid fuels obtained after the heating step in Examples a1 to a5 and Comparative Examples a2 and a3. Since the moisture contents after immersion in water are those after immersion for 168 hours, the moisture contents in the solid fuels are considered to have substantially reached equilibrium.

Comparative Example a1

Comparative Example a1 is an unheated biomass solid fuel (WP) which is obtained only by molding after crushing and pulverizing, and is not through the heating step. A binder is not used also in Comparative Example a1. Table 1A and Table 2 also show the properties of the resulting solid fuel of Comparative Example a1. After immersing the unheated biomass solid fuel (WP) of Comparative Example a1 in water for 168 hours, the pellets disintegrated and thus each property could not be measured.

The solid fuel (PBT) of Comparative Examples a2 and a3 had a maximum reaching temperature of 200° C. or more in the self-heating property test. In contrast, it was shown that the solid fuels of Examples a1 to a5 had low maximum reaching temperatures in the self-heating property test and thus they are easy to transport and store. The results in Table 1A and Table 2 indicate that as the volatile matter (dry ash free basis) of the solid fuel (PBT) is larger, the maximum reaching temperature in the self-heating property test is lower.

Comparative Example a1 (WP: biomass solid fuel which is obtained only by molding and is not through the heating step) was not able to maintain the pellet shape and disintegrated by immersion in water (168 hours) as described above. In contrast, in the solid fuels of Examples a1 to a5, bonding or adhesion between pulverized biomass particles was maintained and they disintegrated by immersion in water, and COD of discharged water during outdoor storage was low, and thus they have advantageous properties as a solid fuel which is often stored outdoors.

A typical HGI value (based on JIS M 8801) for coal (bituminous coal) is around 50. In the solid fuels of Examples a1 to a5, properties were altered by heating and HGI values (based on JIS M 8801) were higher than that of Comparative Example a1 (WP). A typical HGI value for coal (bituminous coal) is around 50, and pulverizing properties of Examples a1 to a5 are closer to coal and better than Comparative Example a1.

With respect to the mechanical durability (DU), in Examples a1 to a5 (PBT) obtained through the heating step, the strength did not substantially decrease, and powdering hardly occurred even compared with Comparative Example a1 (WP) before water immersion and corresponding PBT before immersion in water, and thus it is indicated that the handleability was maintained. The measurement of mechanical durability of the solid fuel of Comparative Example a1 was impossible because it was disintegrated by immersion in water.

The pH values are approximately about 6 after immersion in water, indicating that no particular problem occurs concerning pH values of the discharged water when the solid fuels are stored outdoor.

From the results of the ball mill grindability, it was confirmed that the pulverizing points were good.

These results were obtained because elution and solidification of organic ingredients such as tar associated with heating made the surface of the biomass solid fuel hydrophobic, indicating that they have advantageous properties as a solid fuel which is often stored outdoors. Since the solid fuels are in a pellet form which have been compacted mainly in the radial direction and therefore, it is considered that the expansion in the radial direction becomes large (the same in the case of Example b to Example f).

Example b: Acacia

In Examples b1 to b3 (PBT) and Comparative Examples b2 to b4 (PBT), biomass solid fuels were produced in the same manner as Example a1, except that acacia was used as a biomass raw material, the pulverized biomass was molded into a pellet shape having a diameter of 8 mm in the molding step and the pellets were heated to the heating temperatures described in Table 1A. The properties of the resulting biomass solid fuels (Examples b1 to b3 and Comparative Examples b2 to b4) obtained after the heating step were measured by the method described above. In Comparative Example b1 (WP), the same raw material as in Examples b1 to b3 and Comparative Examples b2 to b4 was used except for not carrying out the heating step, and the properties thereof were measured. Since the moisture contents after immersion in water are those after immersion for 168 hours, the moisture content in the solid fuel is considered to have substantially reached equilibrium. In Comparative Example b1, immediately after immersion in water, the pellets disintegrated and thus measurement of each property was impossible. The results are shown in Table 1A and Table 2.

Comparative Examples b2 to b4 (PBT) had a maximum reaching temperature of 200° C. in the self-heating property test. In contrast, it is shown that the solid fuels of Examples b1 to b3 had low maximum reaching temperatures in the self-heating property test and thus they are easy to transport and store. The results in Table 1A and Table 2 indicate that as the volatile matter (dry ash free basis) of the solid fuel (PBT) is larger, the maximum reaching temperature in the self-heating property test is lower.

Comparative Example b1 (WP) was not able to maintain the pellet shape and disintegrated by immersion in water (168 hours) as described above. In contrast, the solid fuels of Examples b1 to b3 maintained bonding or adhesion between pulverized biomass particles and did not disintegrate by immersion in water, and COD of discharged water during outdoor storage is low, and thus they have advantageous properties as a solid fuel which is often stored outdoors.

Furthermore, the solid fuels of Examples b1 to b3 also had good physical properties such as HGI, mechanical durability (DU), pH after immersion in water, and ball mill grindability.

Example c: Dipterocarpaceae

In Examples c1 to c4 and Comparative Example c2 (PBT), biomass solid fuels were produced in the same manner as Examples a1, except that the biomass raw material mainly comprising tree species of Dipterocarpaceae (selangan batu: 55 wt %, keruing: 24 wt %, sepetir: 4 wt %, scaphium: 9 wt %, and other tropical broad-leaved trees: 8 wt %, in which each wt % represents a percentage based on the total biomass weight) were used, the pulverized biomass was molded into a pellet shape having a diameter of 8 mm in the molding step and the pellets were heated to the heating temperatures described in Table 1A. The properties of the resulting biomass solid fuels (Examples c1 to c4 and Comparative Example c2) obtained after the heating step were measured by the method described above. In Comparative Example c1 (WP), the same raw material as in Examples c1 to c4 was used except for not carrying out the heating step, and the properties thereof were measured. Since the moisture contents after immersion in water are those after immersion for 168 hours, the moisture content in the solid fuel is considered to have substantially reached equilibrium. In Comparative Example c1, immediately after immersion in water, the pellets disintegrated and thus measurement of each property was impossible. The results are shown in Table 1A and Table 2.

Comparative Example c2 (PBT) had a maximum reaching temperature of 200° C. in the self-heating property test. In contrast, it is shown that the solid fuels of Examples c1 to c4 had low maximum reaching temperatures in the self-heating property test and thus they are easy to transport and store. The results in Table 1A and Table 2 indicate that as the volatile matter (dry ash free basis) of the solid fuel (PBT) is larger, the maximum reaching temperature in the self-heating property test is lower.

Comparative Example c1 (WP) was not able to maintain the pellet shape and disintegrated by immersion in water (168 hours) as described above. In contrast, the solid fuels of Examples c1 to c4 maintained bonding or adhesion between pulverized biomass particles and did not disintegrate by immersion in water, and COD of discharged water during outdoor storage was low, and thus they have advantageous properties as a solid fuel which is often stored outdoors.

Furthermore, the solid fuels of Examples c1 to c4 also had good physical properties such as HGI, mechanical durability (DU), pH after immersion in water, and ball mill grindability.

Example d: *Pinus radiata*

In Examples d1 to d4 and Comparative Example d2 (PBT), biomass solid fuels were produced in the same manner as Examples a1, except that *Pinus radiata* was used as a biomass raw material, the pulverized biomass was molded into a pellet shape having a diameter of 6 mm in the molding step and the pellets were heated to the heating temperatures described in Table 1B. The properties of the resulting biomass solid fuels (Examples d1 to d4 and Comparative Examples d2) obtained after the heating step were measured by the method described above. In Comparative Example d1 (WP), the same raw material as in Examples d1 to d4 and Comparative Example d2 was used except for not carrying out the heating step, and the properties thereof were measured. Since the moisture contents after immersion in water are those after immersion for 168 hours, the moisture content in the solid fuel is considered to have substantially reached equilibrium. In Comparative Example d1, immediately after immersion in water, the pellets disintegrated and thus measurement of each property was impossible. The results are shown in Table 1B and Table 2.

Comparative Examples d2 (PBT) had a maximum reaching temperature of 200° C. in the self-heating property test. In contrast, it is shown that the solid fuels of Examples d1 to d4 had low maximum reaching temperatures in the self-heating property test and thus they are easy to transport and store. The results in Table 1B and Table 2 indicate that as the volatile matter (dry ash free basis) of the solid fuel (PBT) is larger, the maximum reaching temperature in the self-heating property test is lower.

Comparative Example d1 (WP) was not able to maintain the pellet shape and disintegrated by immersion in water (168 hours) as described above. In contrast, the solid fuels of Examples d1 to d4 maintained bonding or adhesion between pulverized biomass particles and did not disintegrate by immersion in water, and COD of discharged water during outdoor storage was low, and thus they have advantageous properties as a solid fuel which is often stored outdoors.

Furthermore, the solid fuels of Examples d1 to d4 also had good physical properties such as HGI, mechanical durability (DU), pH after immersion in water, and ball mill grindability.

Example e: Mixture of Larch, Spruce and Birch

In Examples e1 to e3 (PBT) and Comparative Examples e2 (PBT), biomass solid fuels were produced in the same manner as Examples a1, except that a mixture of 50 wt % of larch, 45 wt % of spruce and 5 wt % of birch was used as a biomass raw material, the pulverized biomass was molded into a pellet shape having a diameter of 8 mm in the molding step and the pellets were heated to the heating temperatures described in Table 1B. The properties of the resulting biomass solid fuels (Examples e1 to e3 and Comparative Example e2) obtained after the heating step were measured by the method described above. In Comparative Example e1 (WP), the same raw materials as in Examples e1 to e3 and Comparative Example e2 was used except for not carrying out the heating step, and the properties thereof were measured. Since the moisture contents after immersion in water are those after immersion for 168 hours, the moisture content in the solid fuel is considered to have substantially reached equilibrium. In Comparative Example e1, immediately after immersion in water, the pellets disintegrated and thus measurement of each property was impossible. The results are shown in Table 1B and Table 2.

Comparative Examples e2 (PBT) had a maximum reaching temperature of 200° C. in the self-heating property test. In contrast, it is shown that the solid fuels of Examples e1 to e3 had low maximum reaching temperatures in the self-heating property test and thus they are easy to transport and store. The results in Table 1B and Table 2 indicate that as the volatile matter (dry ash free basis) of the solid fuel (PBT) is larger, the maximum reaching temperature in the self-heating property test is lower.

Comparative Example e1 (WP) was not able to maintain the pellet shape and disintegrated by immersion in water (168 hours) as described above. In contrast, the solid fuels of Examples e1 to e3 maintained bonding or adhesion between pulverized biomass particles and did not disintegrate by immersion in water, and COD of discharged water during outdoor storage was low, and thus they have advantageous properties as a solid fuel which is often stored outdoors.

Furthermore, the solid fuels of Examples e1 to e3 also had good physical properties such as HGI, mechanical durability (DU), pH after immersion in water, and ball mill grindability.

Example f. Mixture of Spruce, Pine and Fir

In Examples f1 to f6 and Comparative Example f2 (PBT), biomass solid fuels were produced in the same manner as Examples a1, except that a mixture of 30 wt % of spruce, 45 wt % of pine and 25 wt % of fir was used as a biomass raw material, the pulverized biomass was molded into a pellet shape having a diameter of 6 mm in the molding step and the pellets were heated to the heating temperatures described in Table 3A. The properties of the resulting biomass solid fuels (Examples f1 to f6 and Comparative Example f2) obtained after the heating step were measured by the method described above. In Comparative Example f1 (WP), the same raw material as in Examples f1 to f6 and Comparative Example f2 was used except for not carrying out the heating step, and the properties thereof were measured. Since the moisture contents after immersion in water are those after immersion for 168 hours, the moisture content in the solid fuel is considered to have substantially reached equilibrium. In Comparative Example f1, immediately after immersion in water, the pellets disintegrated and thus measurement of each property could not be measured. The results are shown in Table 3A and Table 3B.

Comparative Example f2 (PBT) had a maximum reaching temperature of 200° C. in the self-heating property test. In contrast, it is shown that the solid fuels of Examples f1 to f6 had low maximum reaching temperatures in the self-heating property test and thus they are easy to transport and store. The results in Table 3A and Table 3B indicate that as the volatile matter (dry ash free basis) of the solid fuel (PBT) is larger, the maximum reaching temperature in the self-heating property test is lower.

Comparative Example f1 (WP) was not able to maintain the pellet shape and disintegrated by immersion in water (168 hours) as described above. In contrast, the solid fuels of Examples f1 to f6 maintained bonding or adhesion between pulverized biomass particles and did not disintegrate by immersion in water, and COD of discharged water during outdoor storage was low, and thus they have advantageous properties as a solid fuel which are often stored outdoors.

Furthermore, the solid fuels of Examples f1 to f6 also had good physical properties such as HGI, mechanical durability (DU), pH after immersion in water, and ball mill grindability.

TABLE 1A

| raw material | unit | | heating temperature °C. | solid yield (dry) wt %- dry | thermal yield % | FC wt %- AD | VM wt %- AD | VM wt %- daf | fuel ratio FC/ VM | HHV kcal/ kg- dry | BET specific surface area m²/g | O wt %- dry | H wt %- dry | C wt %- dry | O/C (molar ratio) | H/C (molar ratio) | HGI | HGI ratio |
|---|---|---|---|---|---|---|---|---|---|---|---|---|---|---|---|---|---|---|
| rubber tree (Example a) | Comp- Ex. a1 | | 25 | 100 | 100 | 14.7 | 71.6 | 83.0 | 0.21 | 4,553 | | 42.9 | 5.0 | 48.4 | 0.66 | 1.24 | 17 | 1.00 |
| | Ex. a1 | | 230 | 93.3 | 98.0 | 17.0 | 72.0 | 80.9 | 0.24 | 4,780 | 0.415 | 41.1 | 5.2 | 50.0 | 0.62 | 1.25 | 26 | 1.53 |
| | Ex. a2 | | 240 | 88.3 | 95.3 | 19.4 | 70.4 | 78.4 | 0.28 | 4,912 | | 39.6 | 5.3 | 51.4 | 0.58 | 1.24 | 29 | 1.71 |
| | Ex. a3 | | 245 | 85.6 | 93.4 | 20.2 | 69.7 | 77.5 | 0.29 | 4,968 | 0.420 | 38.9 | 5.3 | 52.1 | 0.56 | 1.22 | 31 | 1.82 |
| | Ex. a4 | | 247 | 83.8 | — | 21.1 | 68.9 | 76.6 | 0.31 | — | | — | — | — | — | — | — | — |
| | Ex. a5 | | 249 | 83.4 | 92.1 | 21.2 | 68.6 | 76.4 | 0.31 | 5,027 | | 38.5 | 5.1 | 52.8 | 0.55 | 1.16 | 32 | 1.88 |
| | Comp- Ex. a2 | | 255 | 76.8 | 87.6 | 24.2 | 65.8 | 73.1 | 0.37 | 5,192 | 0.443 | 36.0 | 5.2 | 54.7 | 0.49 | 1.14 | 35 | 2.06 |
| | Comp- Ex. a3 | | 270 | 68.4 | 81.8 | 29.0 | 60.9 | 67.7 | 0.48 | 5,444 | 0.457 | 33.3 | 5 | 57.3 | 0.44 | 1.05 | 42 | 2.47 |
| acacia (Example b) | Comp- Ex. b1 | | 25 | 100.0 | 100.0 | 14.8 | 72.7 | 83.1 | 0.20 | 4,780 | 0.313 | 42.3 | 5.5 | 50.2 | 0.63 | 1.31 | 18 | 1.00 |
| | Ex. b1 | | 230 | 94.0 | 98.3 | 16.5 | 74.5 | 81.9 | 0.22 | 5,001 | 0.378 | 40.8 | 5.5 | 52.0 | 0.59 | 1.27 | 43 | 2.39 |
| | Ex. b2 | | 240 | 89.7 | 95.2 | 18.1 | 73.2 | 80.2 | 0.25 | 5,075 | — | 39.8 | 5.6 | 53.0 | 0.56 | 1.27 | 42 | 2.33 |

TABLE 1A-continued

| raw material | unit | heating temperature °C. | solid yield (dry) wt %-dry | thermal yield % | FC wt %-AD | VM wt %-AD | VM wt %-daf | fuel ratio FC/VM | HHV kcal/kg-dry | BET specific surface area m²/g | O wt %-dry | H wt %-dry | C wt %-dry | O/C (molar ratio) | H/C (molar ratio) | HGI | HGI ratio |
|---|---|---|---|---|---|---|---|---|---|---|---|---|---|---|---|---|---|
| | Ex. b3 | 250 | 85.7 | 93.7 | 20.2 | 72.1 | 78.1 | 0.28 | 5,225 | 0.412 | 38.2 | 5.5 | 54.6 | 0.52 | 1.21 | 52 | 2.89 |
| | Comp-Ex. b2 | 253 | 83.4 | 91.9 | 20.8 | 71.2 | 77.4 | 0.29 | 5,270 | — | 38.1 | 5.5 | 54.8 | 0.52 | 1.20 | 40 | 2.22 |
| | Comp-Ex. b3 | 255 | 82.0 | 91.1 | 21.6 | 71.1 | 76.7 | 0.30 | 5,312 | — | 37.8 | 5.5 | 55.0 | 0.52 | 1.20 | — | — |
| | Comp-Ex. b4 | 260 | 80.1 | 89.5 | 22.9 | 69.5 | 75.2 | 0.33 | 5,342 | — | 36.7 | 5.5 | 56.0 | 0.49 | 1.18 | 42 | 2.33 |
| Dipterocarpaceae etc. (Example c) | Comp-Ex. c1 | 25 | 100.0 | 100.0 | 13.7 | 74.3 | 84.4 | 0.18 | 4,759 | 0.296 | 42.0 | 5.5 | 50.6 | 0.63 | 1.30 | 23 | 1.00 |
| | Ex. c1 | 230 | 95.0 | 99.2 | 16 | 74.7 | 82.4 | 0.21 | 4,975 | 0.330 | 40.8 | 5.6 | 51.8 | 0.59 | 1.30 | 33 | 1.43 |
| | Ex. c2 | 240 | 92.4 | 98.6 | 17.5 | 74.1 | 80.9 | 0.24 | 5,084 | — | 40.0 | 5.6 | 52.8 | 0.57 | 1.27 | 54 | 2.36 |
| | Ex. c3 | 250 | 87.0 | 94.3 | 19.1 | 72.6 | 79.2 | 0.26 | 5,156 | 0.351 | 38.6 | 5.7 | 54.0 | 0.54 | 1.27 | 41 | 1.78 |
| | Ex. c4 | 255 | 86.5 | 95.0 | 19.7 | 72.0 | 78.5 | 0.27 | 5,231 | — | 38.6 | 5.5 | 54.4 | 0.53 | 1.21 | 43 | 1.87 |
| | Comp-Ex. c2 | 260 | 84.2 | 93.7 | 21.1 | 71.2 | 77.1 | 0.30 | 5,302 | — | 37.6 | 5.6 | 55.2 | 0.51 | 1.22 | 54 | 2.35 |

Comp.-Ex. = Comparative Example
Ex. = Example

TABLE 1B

| raw material | unit | heating temperature °C. | solid yield (dry) wt %-dry | thermal yield % | FC wt %-AD | VM wt %-AD | VM wt %-daf | fuel ratio FC/VM | HHV kcal/kg-dry | BET specific surface area m²/g | O wt %-dry | H wt %-dry | C wt %-dry | O/C (molar ratio) | H/C (molar ratio) | HGI | HGI ratio |
|---|---|---|---|---|---|---|---|---|---|---|---|---|---|---|---|---|---|
| Pinus radiata (Example d) | Comp-Ex. d1 | 25 | 100.0 | 100.0 | 11.2 | 76.6 | 87.2 | 0.15 | 4,754 | — | 43.1 | 5.6 | 50.6 | 0.64 | 1.33 | 24 | 1.00 |
| | Ex. d1 | 250 | 92.1 | 99.4 | 16.1 | 75.4 | 82.4 | 0.21 | 5,131 | — | 40.5 | 5.7 | 53.0 | 0.57 | 1.29 | 33 | 1.38 |
| | Ex. d2 | 260 | 89.1 | 97.6 | 17.3 | 74.4 | 81.1 | 0.23 | 5,207 | 0.321 | 39.6 | 5.7 | 54.0 | 0.55 | 1.27 | 33 | 1.38 |
| | Ex. d3 | 265 | 84.9 | 94.3 | 18.0 | 74.4 | 80.5 | 0.24 | 5,282 | 0.330 | 38.8 | 5.8 | 54.8 | 0.53 | 1.27 | 29 | 1.21 |
| | Ex. d4 | 270 | 81.9 | 92.8 | 20.3 | 72.0 | 78.0 | 0.28 | 5,387 | — | 37.9 | 5.6 | 55.7 | 0.51 | 1.21 | 38 | 1.63 |
| | Comp-Ex. d2 | 275 | 79.2 | 90.7 | 21.4 | 72.4 | 77.2 | 0.30 | 5,446 | 0.334 | 37.4 | 5.4 | 56.5 | 0.50 | 1.15 | 38 | 1.58 |
| larch + spruce + birch (Example e) | Comp-Ex. e1 | 25 | 100.0 | 100.0 | 12.4 | 75.8 | 85.9 | 0.16 | 4,752 | 0.113 | 43.7 | 5.5 | 50.4 | 0.65 | 1.31 | 17 | 1.00 |
| | Ex. e1 | 230 | 93.7 | 97.3 | 13.3 | 77.1 | 85.3 | 0.17 | 4,936 | 0.161 | 42.8 | 5.3 | 51.4 | 0.62 | 1.24 | 21 | 1.24 |
| | Ex. e2 | 250 | 89.2 | 95.2 | 15.6 | 76.3 | 83.0 | 0.20 | 5,076 | 0.199 | 41.3 | 5.5 | 52.8 | 0.59 | 1.25 | 22 | 1.29 |
| | Ex. e3 | 270 | 79.6 | 90.3 | 20.6 | 72.3 | 77.8 | 0.28 | 5,395 | 0.218 | 38.5 | 5.4 | 55.6 | 0.52 | 1.17 | 32 | 1.88 |
| | Comp-Ex. e2 | 290 | 70.2 | 84.8 | 27.4 | 66.8 | 70.9 | 0.41 | 5,741 | — | 34.0 | 5.3 | 59.8 | 0.43 | 1.06 | 46 | 2.71 |

Comp.-Ex. = Comparative Example
Ex. = Example

TABLE 2

| | unit | ball mill grindability point | initial dimensions (Φ1 (mm) × L1 (mm)) | mechanical durability (DU) | bulk density kg/m³ | Self-heating property test maximum reaching temperature °C | COD mg/L | after immersion in water | | | | |
|---|---|---|---|---|---|---|---|---|---|---|---|---|
| | | | | | | | | immersion time h | dimensions (Φ2 (mm) × L2 (mm)) | pH | moisture content wt % | mechanical durability (DU) |
| Ex. a | Comp-Ex. a1 | 21 | Φ7.9 × 47.1 | 98.7 | 661 | 142 | 1100 | disintegration | | | | |
| | Ex. a1 | 42 | Φ7.8 × 42.3 | 98.8 | 643 | 146 | 930 | 168 | Φ8.7 × 42.8 | 5.8 | 29.4 | 98.1 |
| | Ex. a2 | 21 | Φ7.7 × 44.0 | 98.2 | 626 | 156 | 630 | 168 | Φ8.2 × 44.3 | 5.9 | 25.9 | 98.2 |
| | Ex. a3 | 72 | Φ7.6 × 41.6 | 98.0 | 626 | 156 | 570 | 168 | Φ8.0 × 41.9 | 5.9 | 24.8 | 98.2 |
| | Ex. a4 | 70 | Φ7.6 × 33.1 | — | 637 | 167 | — | 168 | Φ7.9 × 33.4 | 6.0 | 24.3 | — |
| | Ex. a5 | 78 | Φ7.6 × 36.4 | — | 634 | 172 | — | 168 | Φ7.8 × 36.3 | 6.2 | 23.3 | — |

TABLE 2-continued

|  | unit | ball mill grind-ability point | initial dimensions (Φ1 (mm) × L1 (mm)) | mechanical durability (DU) | bulk density kg/m³ | Self-heating property test maximum reaching temper-ature ° C. | COD mg/L | after immersion in water immersion time h | dimensions (Φ2 (mm) × L2 (mm)) | pH | moisture content wt % | mechanical durability (DU) |
|---|---|---|---|---|---|---|---|---|---|---|---|---|
|  | Comp-Ex. a2 | 93 | Φ7.4 × 38.1 | 97.2 | 594 | 200 | 330 | 168 | Φ7.6 × 38.3 | 6.5 | 25.2 | 97.3 |
|  | Comp-Ex. a3 | 99 | Φ7.3 × 32.4 | 96.0 | 570 | 200 | 200 | 168 | Φ7.4 × 32.8 | 7.1 | 24.4 | 96.4 |
| Ex. b | Comp-Ex. b1 | 5 | Φ8.1 × 22.4 | 98.3 | 723 | 142 | 310 |  | disintegration | | | |
|  | Ex. b1 | 26 | Φ7.9 × 25.1 | 97.2 | 684 | 147 | 400 | 168 | Φ8.6 × 25.7 | 4.8 | 24.0 | 96.2 |
|  | Ex. b2 | 47 | Φ7.8 × 23.9 | 95.9 | 673 | 156 | 340 | 168 | Φ8.2 × 24.9 | 5.0 | 21.9 | 96.3 |
|  | Ex. b3 | 73 | Φ7.7 × 22.9 | 95.2 | 656 | 156 | 300 | 168 | Φ8.0 × 23.2 | 5.0 | 21.1 | 96.1 |
|  | Comp-Ex. b2 | 78 | Φ7.7 × 23.6 | 94.6 | 646 | 200 | 360 | 168 | Φ8.0 × 23.7 | 5.4 | 21.4 | 95.6 |
|  | Comp-Ex. b3 | — | — | — | — | 200 | — | — | — | — | — | — |
|  | Comp-Ex. b4 | 88 | Φ7.5 × 22.1 | 94.1 | 640 | 200 | 210 | 168 | Φ7.8 × 22.5 | 5.5 | 21.2 | 95.5 |
| Ex. c | Comp-Ex. c1 | 20 | Φ8.1 × 22.6 | 98.1 | 776 | 142 | 560 |  | disintegration | | | |
|  | Ex. c1 | 52 | Φ8.0 × 31.3 | 97.2 | 737 | 147 | 460 | 168 | Φ8.8 × 32.9 | 5.1 | 25.3 | 92.5 |
|  | Ex. c2 | 80 | Φ7.9 × 22.1 | 95.7 | 717 | 153 | 340 | 168 | Φ8.4 × 22.6 | 5.2 | 21.9 | 95.7 |
|  | Ex. c3 | 90 | Φ7.9 × 32.1 | 96.2 | 703 | 161 | 250 | 168 | Φ8.2 × 32.6 | 5.4 | 19.5 | 96.4 |
|  | Ex. c4 | 94 | Φ8.0 × 21.9 | 95.0 | 687 | 178 | — | 168 | Φ8.0 × 22.2 | 5.5 | 22.5 | 95.5 |
|  | Comp-Ex. c2 | 95 | Φ7.8 × 22.5 | 94.6 | 686 | 200 | 240 | 168 | Φ8.1 × 23.0 | 5.5 | 21.7 | 95.4 |
| Ex. d | Comp-Ex. d1 | 14 | Φ6.6 × 15.0 | 98.7 | 719 | 143 | 750 |  | disintegration | | | |
|  | Ex. d1 | 66 | Φ6.4 × 18.1 | 96.5 | 655 | 148 | 800 | 168 | Φ6.8 × 18.6 | 4.8 | 24.7 | 96.3 |
|  | Ex. d2 | 74 | Φ6.4 × 17.4 | 96.2 | 642 | 151 | 740 | 168 | Φ6.6 × 17.9 | 4.7 | 22.9 | 96.6 |
|  | Ex. d3 | 85 | Φ6.3 × 16.7 | 94.8 | 613 | 157 | 610 | 168 | Φ6.5 × 17.0 | 5.0 | 23.4 | 95.5 |
|  | Ex. d4 | 88 | Φ6.2 × 17.3 | 94.0 | 610 | 165 | 460 | 168 | Φ6.4 × 17.5 | 5.2 | 22.5 | 95.5 |
|  | Comp-Ex. d2 | 93 | Φ6.2 × 19.1 | 93.4 | 597 | 200 | 340 | 168 | Φ6.4 × 19.2 | 5.1 | 21.7 | 95.4 |
| Ex. e | Comp-Ex. e1 | 8 | Φ8.1 × 22.6 | 99.5 | 713 | 143 | 3,600 |  | disintegration | | | |
|  | Ex. e1 | 27 | Φ7.8 × 22.9 | 99.0 | 685 | 144 | 950 | 168 | Φ8.8 × 24.0 | 5.0 | 28.6 | 98.4 |
|  | Ex. e2 | 51 | Φ7.8 × 22.9 | 98.4 | 662 | 149 | 740 | 168 | Φ8.2 × 23.6 | 5.0 | 23.4 | 98.7 |
|  | Ex. e3 | 98 | Φ7.7 × 22.8 | 97.0 | 619 | 157 | 330 | 168 | Φ7.9 × 23.0 | 5.1 | 21.4 | 97.8 |
|  | Comp-Ex. e2 | 94 | Φ7.5 × 26.0 | 95.7 | 580 | 200 | 72 | 168 | Φ7.5 × 25.9 | 5.8 | 21.7 | 96.0 |

Comp-Ex. = Comparative Example

Ex. = Example

TABLE 3B

| raw material | unit | heating temper-ature ° C. | solid yield (dry) wt %-dry | ther-mal yield % | FC wt %-AD | VM wt %-AD | VM wt %-daf | fuel ratio FC/VM | HHV kcal/kg-dry | BET specific surface area m²/g | O wt %-dry | H wt %-dry | C wt %-dry | O/C (molar ratio) | H/C (molar ratio) | HGI | HGI ratio |
|---|---|---|---|---|---|---|---|---|---|---|---|---|---|---|---|---|---|
| spruce + pine + fir (Ex. f) | Comp-Ex. f1 | 25 | 100.0 | 100.0 | 12.7 | 75.8 | 85.6 | 0.17 | 4,794 | 0.183 | 42.6 | 5.4 | 51.2 | 0.62 | 1.27 | 18 | 1.00 |
|  | Ex. f1 | 250 | 90.0 | 96.5 | 17.3 | 74.5 | 81.2 | 0.23 | 5,140 | 0.271 | 40.3 | 5.3 | 53.8 | 0.56 | 1.18 | 35 | 1.94 |
|  | Ex. f2 | 255 | 88.0 | 95.7 | 18.3 | 74.4 | 80.3 | 0.25 | 5,211 | 0.277 | 39.7 | 5.4 | 54.3 | 0.55 | 1.19 | 32 | 1.78 |
|  | Ex. f3 | 260 | 86.2 | 94.4 | 18.1 | 74.2 | 80.4 | 0.24 | 5,249 | 0.283 | 39.3 | 5.3 | 54.8 | 0.54 | 1.16 | 35 | 1.94 |
|  | Ex. f4 | 265 | 83.5 | 92.8 | 20.2 | 72.8 | 78.3 | 0.28 | 5,330 | 0.297 | 38.1 | 5.4 | 55.7 | 0.51 | 1.16 | 36 | 2.00 |
|  | Ex. f5 | 270 | 80.4 | 91.4 | 21.3 | 72.1 | 77.2 | 0.30 | 5,452 | 0.302 | 37.9 | 5.3 | 56.2 | 0.51 | 1.13 | 37 | 2.06 |
|  | Ex. f6 | 275 | 77.8 | 88.9 | 22.7 | 70.7 | 75.7 | 0.32 | 5,477 | 0.305 | 36.9 | 5.4 | 57.0 | 0.49 | 1.14 | 37 | 2.06 |
|  | Comp-Ex. f2 | 280 | 75.1 | 87.2 | 24.0 | 69.2 | 74.2 | 0.35 | 5,565 | 0.318 | 36.2 | 5.3 | 57.8 | 0.47 | 1.10 | 40 | 2.22 |

TABLE 3B

| | unit | ball mill grind-ability point | initial dimensions (Φ1 (mm) × L1 (mm)) | mechanical durability (DU) | bulk density kg/m³ | temper-ature ° C. | Self-heating property test maximum reaching COD mg/L | after immersion in water immersion time h | dimensions (Φ2 (mm) × L2 (mm)) | pH | moisture content wt % | mechanical durability (DU) |
|---|---|---|---|---|---|---|---|---|---|---|---|---|
| Ex. f | Comp-Ex. f1 | 13 | Φ6.6 × 21.9 | 98.7 | 720 | 143 | 1,500 | 168 | disintegration | | | |
| | Ex. f1 | 71 | Φ6.4 × 17.2 | 96.0 | 658 | 149 | 970 | 168 | Φ6.9 × 17.7 | 5.13 | 23.6 | 94.3 |
| | Ex. f2 | 82 | Φ6.4 × 20.1 | 95.2 | 643 | 152 | 930 | 168 | Φ6.7 × 20.7 | 5.07 | 21.9 | 93.9 |
| | Ex. f3 | 79 | Φ6.3 × 21.6 | 95.1 | 639 | 153 | 860 | 168 | Φ6.6 × 21.8 | 5.09 | 20.4 | 94.7 |
| | Ex. f4 | 85 | Φ6.3 × 21.0 | 94.1 | 610 | 156 | 790 | 168 | Φ6.5 × 21.2 | 5.13 | 20.3 | 94.7 |
| | Ex. f5 | 88 | Φ6.3 × 21.3 | 93.2 | 603 | 164 | 600 | 168 | Φ6.4 × 21.6 | 5.20 | 22.1 | 93.5 |
| | Ex. f6 | 89 | Φ6.2 × 21.1 | 92.8 | 595 | 166 | 420 | 168 | Φ6.4 × 21.1 | 5.29 | 21.7 | 93.8 |
| | Comp-Ex. f2 | 93 | Φ6.2 × 18.5 | 91.9 | 567 | 200 | 130 | 168 | Φ6.3 × 18.6 | 5.41 | 21.8 | 91.6 |

Comp -Ex. = Comparative Example,
Ex. = Example

<Regarding the Relationship Between Heating Temperature when Solid Fuels are Produced and Self-Heating Property>

For solid fuels of Examples a1 and a3 and Comparative Examples a2 and a3 in Example a (rubber tree is used as a raw material), FIG. 1 shows the relationship between the solid temperatures and maximum reaching temperatures of the solid fuels in the wire basket test for biomass solid fuels, which is the same as the above-mentioned self-heating property test. The maximum reaching temperatures in Examples a1 and a3 were less than 200° C., while the temperatures in Comparative Examples a2 and a3 increased to 200° C. or more. The following measurements were carried out using the solid fuels produced in Example a1, Example a3, Comparative Example a2 and Comparative Example a3 in order to investigate the relationship between the heating temperatures and the self-heating properties of such solid fuels in more detail.

(BET Specific Surface Area)

FIG. 2 shows the relationship between the solid temperatures and the BET specific surface areas of the solid fuels of the above Example a1, Example a3, Comparative Example a2 and Comparative Example a3. As the solid temperature rises, the BET specific surface area increases. It is considered that with a rise of the solid temperature, the thermal decomposition proceeds and the volatile matter decreases (see Table 1A), and the pores develop on the pellet surface so that the solid fuel becomes porous.

(Generated Gas Analysis)

Furthermore, the generated gas of solid fuels was measured. For generated gas analysis, the sample was filled to a volume of 95% in a 500 mL wide-mouth glass bottle and the bottle was sealed with a silicone rubber stopper with a septum. The bottle was put into a constant temperature and humidity chamber with 40° C. and 55% RH, and gas ($H_2$, $O_2$, $N_2$, CO, $CH_4$, $CO_2$) generated after 1 day was analyzed by gas chromatography. FIG. 3A, FIG. 3B and FIG. 3C show the relationship between solid temperatures and concentrations of $O_2$, CO, $CO_2$ are shown, respectively. Since the $O_2$ concentration decreased with a rise of the solid temperature, it was confirmed that the amount of $O_2$ adsorption to the surface of the solid fuel was increased (FIG. 3A). On the other hand, with a rise of the solid temperature, the concentrations of CO and $CO_2$ were increased, and it was suggested that the oxidation reaction (exothermic reaction) is progressed by adsorbed $O_2$ (FIG. 3B, FIG. 3C).

In the same way, the analysis was also performed for the solid fuels of Example d2, Example d3 and Comparative Example d2 (the raw material is *Pinus radiata*). Table 4 shows that the relationship between the solid temperatures and the maximum reaching temperatures in the self-heating property test, the BET specific surface areas, and the $O_2$ concentrations in the generated gas analysis. It was also shown that when the raw material is *Pinus radiata*, there is a similar relationship between the solid temperatures and the BET specific surface areas and the $O_2$ concentrations by the generated gas analysis.

TABLE 4

| | Unit | Example d2 | Example d3 | Comparative Example d2 |
|---|---|---|---|---|
| Solid temperature | ° C. | 260 | 265 | 275 |
| maximum reaching temperature in a self-heating property test | ° C. | 151 | 157 | 200 |
| BET specific surface area | m²/g | 0.321 | 0.330 | 0.334 |
| $O_2$ concentration (generated gas analysis) | vol % | 18.96 | 18.52 | 17.56 |

From the results of FIGS. 1 to 3C and Table 4, the following reaction mechanism can be considered for the relationship between the solid temperature and the self-heating property of the solid fuel. First, when the heating temperature at the time of producing the solid fuel is increased, the volatile matter content is reduced and the pellet surface becomes porous, and thereby the BET specific surface area is increased. As a result, the amount of $O_2$ adsorbed to the surface of the solid fuel is increased, and the oxidation reaction (exothermic reaction) proceeds. Therefore, it is presumed that when the solid temperature exceeds a certain temperature, the heat storage amount exceeds the heat radiation amount and the self-heating property becomes 200° C. or more.

<Ignitability>

Furthermore, the inventors of the present invention investigated the thermal physical properties of the biomass solid fuel of the present invention and the solid fuel obtained through a step of steam exploding biomass as described in Patent Document 1, respectively, and found out that the biomass solid fuel of the present invention is excellent in ignitability. The biomass solid fuel used in the test for the ignitability is as follows.

Example a11

The solid fuel (PBT) obtained in the same manner as in Example a1 using rubber tree as a raw material except that the pulverized biomass was molded into a pellet shape having a diameter of 8 mm in the molding step and the pellets were heated to 250° C. as a target temperature in the subsequent heating step Example b3

The solid fuel (PBT) obtained in the above Example b3 using acacia as a raw material Example c3

The solid fuel (PBT) obtained in the above Example c3 using tree species of Dipterocarpaceae as a raw material Comparative Example q The solid fuel q obtained by steam exploding a mixture of coniferous trees and broad-leaved trees as a biomass raw material and molding it into biomass blocks and then heating the biomass blocks at 250° C. (a solid fuel obtained by the production method described in Patent Document 1)

For the above mentioned Example a11, Example b3, Example c3, and Comparative Example q, thermogravimetric measurement (TG) and differential thermal analysis (DTA) were carried out. The measurement methods of TG and DTA are as follows.

(TG and DTA)

TG and DTA were measured using an analyzer STA7300 manufactured by Hitachi High-Tech Sciences for simultaneously measuring differential thermal and thermogravimetry. 5 mg of the sample whose particle size was adjusted to 45 to 90 μm with a cutter mill was heated in the above analyzer at a rate of temperature rise of 5° C./min up to 600° C. while 4 vol % of oxygen-nitrogen mixed gas was being flowed at 200 cc/min and maintained at 600° C. for 60 minutes.

Figure 12:
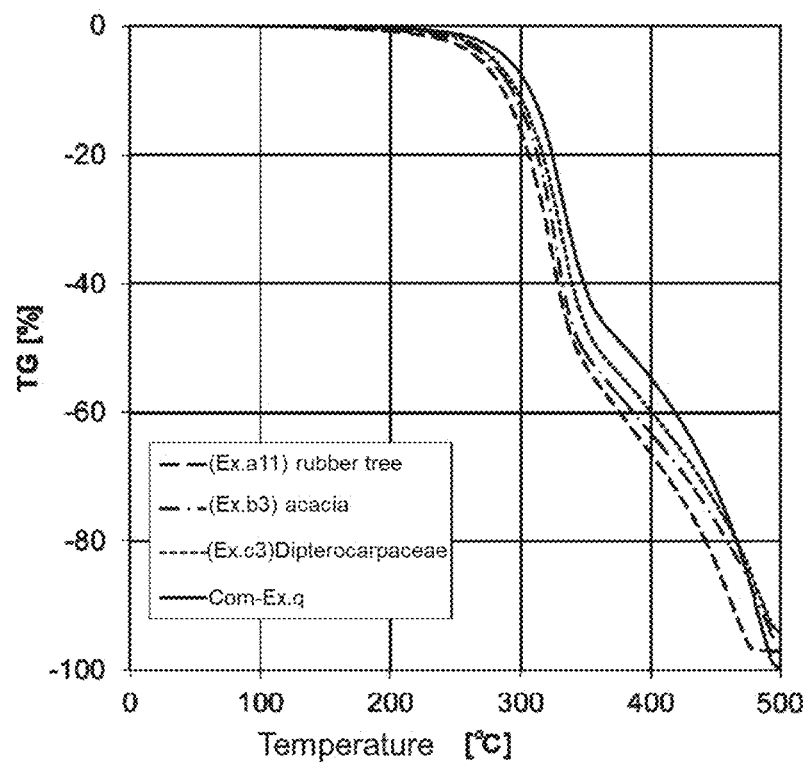
FIG. 12 is a graph showing TG of the solid fuels.
Figure 13:
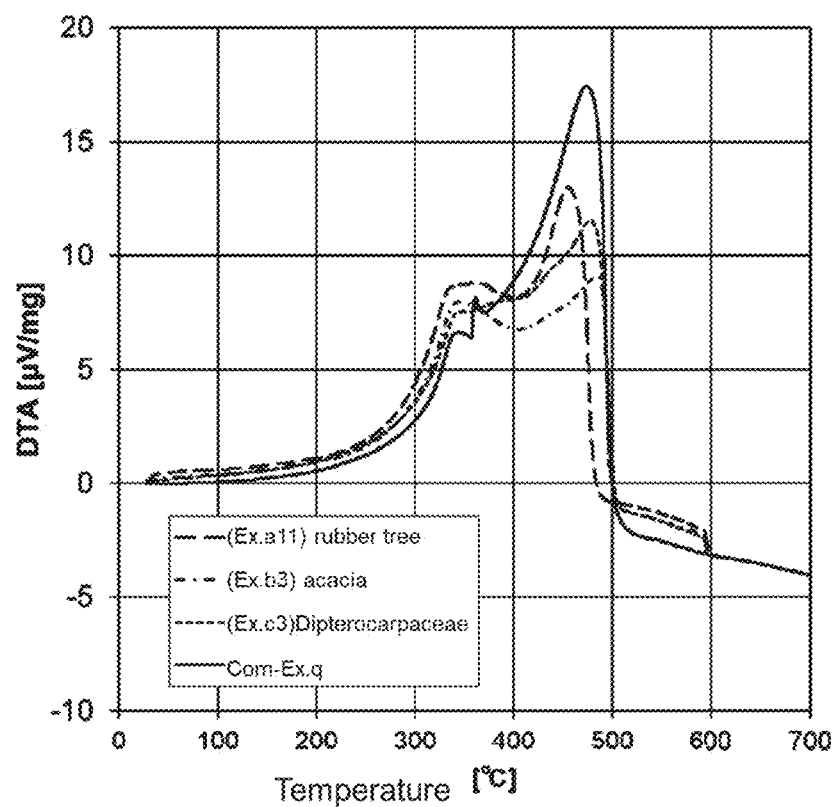
FIG. 13 is a graph showing DTA of the solid fuels.

The results are shown in FIGS. 12 and 13. From the results of TG, since Comparative Example q shows a slow weight loss, volatile matter thereof is few and thus ignitability thereof is low as compared with Example a11, Example b3 and Example c3. Also, from the results of DTA, Comparative Example q shows that the heat generation occurs from the high temperature side and thus the ignitability thereof is low as compared with Example a11, Example b3 and Example c3. The reason for this is presumed as follows. In Comparative Example q, the biomass solid fuel is obtained by the method in the order of pulverizing and drying, steam exploding, molding and heating the biomass, and in the steam explosion, organic substances appear on the surface of the pulverized biomass particles and are volatilized by subsequent heating (carbonization). On the other hand, in the PBT including the Examples a11, b3 and c3, it is inferred that residual amounts of the volatile substances are large because of not being subjected to the explosion step.

Thus, it is presumed that since the biomass solid fuel of the present invention is obtained by the method not comprising the steam explosion step, it is excellent in ignitability in addition to cost reducing as compared with Comparative Example q.

Furthermore, it is presumed that since the residual amount of the terpenes forming solid cross-linking in PBT increases for the same reason and stronger solid crosslinking is achieved, PBT is superior to Comparative Example q in strength and water resistance.

<FT-IR Analysis of PBT and WP>

FIGS. 5 to 9 are charts showing the results of FT-IR analysis of a biomass solid fuel r obtained from the European red pine as a raw material by the same method as the Example b3 (solid fuel (PBT) obtained by pulverizing and molding the raw material to a pellet form and heating at 250° C.). In addition, the data of unheated solid fuel (WP) obtained by pulverizing and molding the same raw material, but with no heating is also shown. Both in the outer surface of the pellet (FIG. 5) and in cross-sectional center (FIG. 6), the amount of COOH groups is WP>PBT, and the amount of C=C bonds is PBT>WP. Further, the amount of COOH group eluted into acetone extract (FIG. 7) is WP>PBT, indicating that PBT has less hydrophilic COOH groups. In addition, in the solids after acetone extraction (FIG. 8), the PBT has more C=C bonds than WP. Thus, it is understood that PBT is excellent in water resistance.

FIG. 9 is a chart showing the results of GC-MS analysis of the acetone extract solution. Solid fuel r (PBT) and unheated solid fuel (WP) were used as is the case with FIGS. 5 to 8. As shown in FIG. 9, the eluted amount of the abietic acid and the like, which is a kind of terpenes, to acetone is smaller in the case of PBT than in the case of WP. Thus, the results are considered showing that abietic acid melted by heating to form liquid cross-linkage, and solid cross-linkage was formed by the volatilization of abietic acid and the like. It is presumed that since the biomass solid fuel of the present invention is also PBT obtained by molding and heating pulverized biomass particles, PBT is excellent in water resistance by the same mechanism as the biomass solid fuel r.

<Water Absorption Distribution in PBT and PAT>

Figure 10:
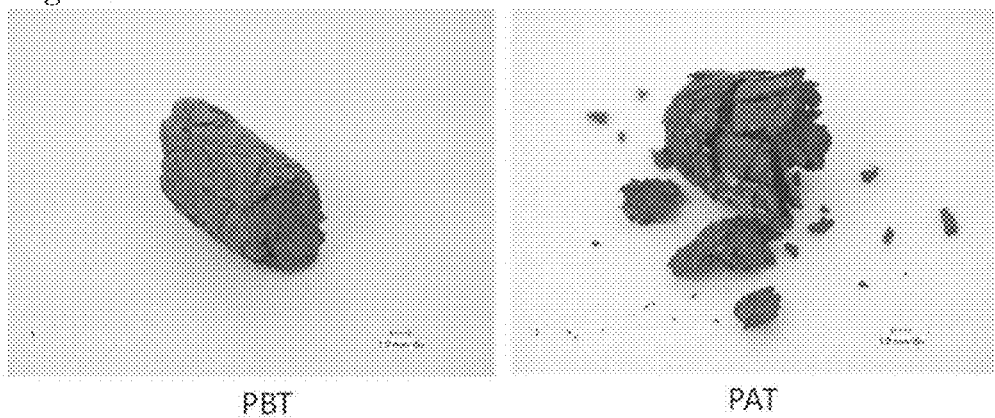
FIG. 10 is a photograph showing the shape of a pellet after the solid fuels are immersed in physiological saline solution.
Figure 11:
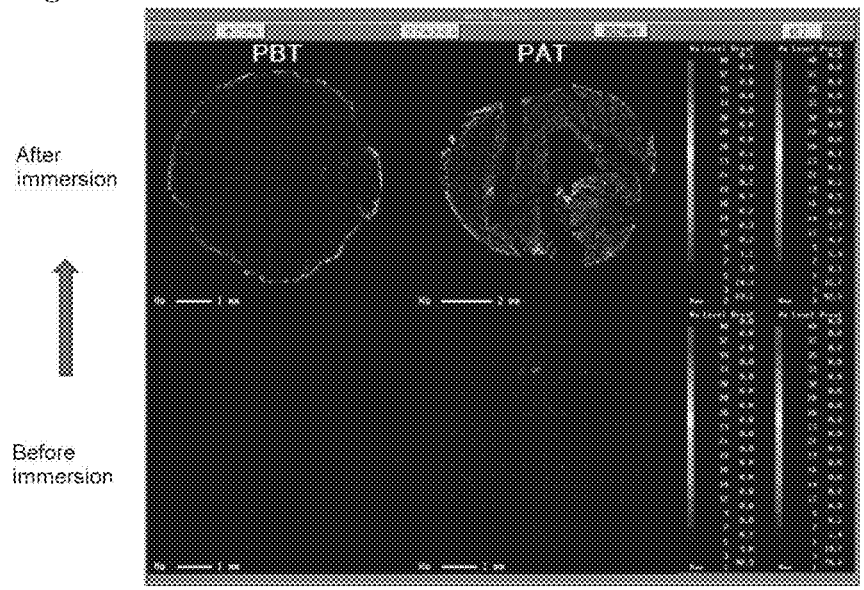
FIG. 11 is a diagram showing the distribution of sodium before and after the solid fuels are immersed in physiological saline.

In order to compare the water resistance of PAT and PBT, the inventors of the present invention examined sodium distribution of the biomass solid fuels after water absorption using saline solution. As a sample of PAT, a solid fuel obtained by heating a raw material of European red pine at 250° C. and then molding into pellets having diameter of 6 mm was used. As a sample of PBT, a solid fuel obtained by molding a raw material of European red pine into pellets having diameter of 6 mm and then heating it at 250° C. The PBT and PAT were immersed in 0.9 wt % saline solution for 5 days. As a result, as FIG. 10 shows the appearance of pellets, the PBT maintained its pellet shape (FIG. 10, left), whereas the PAT disintegrated largely (FIG. 10, right). Further, for PAT and PBT each, samples before and after immersion in 0.9 wt % saline solution for 5 days were analyzed at their cross section by EPMA (Electron Probe MicroAnalyser) analysis, to compare Na distribution. In the PBT, Na distribution remains at the surface of the pellet and does not penetrate into the inside, whereas, in the PAT, Na is widely distributed into the inside (see FIG. 11). This means that penetration of saline solution is less in the PBT than in the PAT. From this result, it is presumed that in PBT, the thermal decomposition products of extracted components make a solid cross-linking in the gap between adjacent pulverized biomass particles and become hydrophobic to prevent the penetration of water, whereas, in PAT, since water can penetrate into the gap between pulverized biomass particles, water permeates into the inside of pellets and expands the gap between pulverized biomass particles, leading to the disintegrate.

The invention claimed is:

1. A biomass solid fuel which is obtained by molding a pulverized biomass into unheated biomass blocks and heating the unheated biomass blocks at a temperature of 230° C. to 270° C., wherein mutual bonding or adhesion between pulverized biomass particles is maintained after immersion in water, and which has a maximum reaching temperature of less than 200° C. in a self-heating property test in which the biomass solid fuel is charged into a sample container placed in an oven at a temperature of 140° C., and the temperature of the biomass solid fuel is continually measured for 24 hours during which the highest temperature thereof is defined as the maximum reaching temperature, and wherein at least one condition selected from the group consisting of the following conditions, (d1) and (e1) is satisfied:

condition (d1): a raw material of the pulverized biomass comprises *Pinus radiata*, and the biomass solid fuel has a volatile matter (dry ash free basis) of 77.5 wt % or more; and condition (e1): a raw material of the pulverized biomass comprises a mixture of larch, spruce and birch, and the biomass solid fuel has a volatile matter (dry ash free basis) of 71.0 wt % or more.

2. The biomass solid fuel according to claim 1, having a fuel ratio of 0.10 to 0.45.

3. The biomass solid fuel according to claim 1, wherein at least one condition selected from the group consisting of the conditions, (d2) and (e2) is satisfied:

condition (d2): the condition (d1) is satisfied, and the biomass solid fuel has a fuel ratio of 0.295 or less; and condition (e2): the condition (e1) is satisfied, and the biomass solid fuel has a fuel ratio of 0.405 or less.

4. The biomass solid fuel according to claim 1, wherein at least one condition selected from the group consisting of the following conditions (d3) and (e3) is satisfied:

condition (d3): the condition (d1) is satisfied, and mechanical durability DU after immersion in water of the biomass solid fuel is 95.5 or more; and condition (e3): the condition (e1) is satisfied, and mechanical durability DU after immersion in water of the biomass solid fuel is 97.8 or more.

5. The biomass solid fuel according to claim 1, wherein the following condition (d4) is satisfied:

condition (d4): the condition (d1) is satisfied, and the unheated biomass blocks are heated at a temperature of 250° C. to 270° C.

6. The biomass solid fuel according to claim 4, wherein at least one condition selected from the group consisting of the following conditions (d5) and (e5) is satisfied:

condition (d5): the condition (d3) is satisfied, and mechanical durability DU after immersion in water of the biomass solid fuel is 96.6 or less; and condition (e5): the condition (e3) is satisfied, and mechanical durability DU after immersion in water of the biomass solid fuel is 98.7 or less.

* * * * *

UNITED STATES PATENT AND TRADEMARK OFFICE
CERTIFICATE OF CORRECTION

PATENT NO. : 11,939,549 B2
APPLICATION NO. : 16/652623
DATED : March 26, 2024
INVENTOR(S) : Yuusuke Hiraiwa, Shigeya Hayashi and Nobuyuki Ooi It is certified that error appears in the above-identified patent and that said Letters Patent is hereby corrected as shown below:

On the Title Page

Column 2, Line 1, under Item (56) Other Publications, delete ""Preperties" and insert --"Properties--.

In the Specification

In Column 5, Line 13, delete "400 m" and insert --400 μm--.

In Column 13, Line 8 (Approx.), delete "daf" and insert --daf:--.

In Column 13, Line 49, delete "(136.5" and insert --(Φ36.5--.

In Column 21, Lines 14-15 (Approx.), delete "Dipterocarpaceae" and insert --Dipterocarpaceae,--.

In Column 21, Line 22 (Approx.), delete "Comp.-Ex." and insert --Comp-Ex.--.

In Column 21, Line 45 (Approx.), delete "Comp.-Ex." and insert --Comp-Ex.--.

In Columns 23-24, Line 40 (Approx.), delete "3B" and insert --3A--.

In Columns 25-26, Line 8 (Approx.), delete "dimensions" and insert --dimension--.

In Columns 25-26, Line 8 (Approx.), delete "dimensions" and insert --dimension--.

In Column 27, Line 12, delete "step" and insert --step.--.

In Column 28, Line 57, delete "MicroAnalyser)" and insert --Micro Analyser)--.

Signed and Sealed this
Thirteenth Day of August, 2024

Katherine Kelly Vidal
*Director of the United States Patent and Trademark Office*

In the Claims

In Column 29, Claim 3, Line 31, delete "conditions," and insert --conditions--.